(12) United States Patent
Nishiura et al.

(10) Patent No.: US 10,547,771 B2
(45) Date of Patent: Jan. 28, 2020

(54) PRINTER, DIGITAL CAMERA WITH PRINTER, AND PRINTING METHOD

(71) Applicant: FUJIFILM Corporation, Tokyo (JP)

(72) Inventors: Yoshikuni Nishiura, Tokyo (JP); Shinichi Fujimoto, Tokyo (JP); Tsuneo Sato, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 65 days.

(21) Appl. No.: 15/830,030

(22) Filed: Dec. 4, 2017

(65) Prior Publication Data

US 2018/0176433 A1 Jun. 21, 2018

(30) Foreign Application Priority Data

Dec. 15, 2016 (JP) .................................. 2016-243287

(51) Int. Cl.
*H04N 5/225* (2006.01)
*H04N 1/00* (2006.01)
(Continued)

(52) U.S. Cl.
CPC ....... *H04N 5/2257* (2013.01); *H04N 1/00148* (2013.01); *H04N 1/00161* (2013.01);
(Continued)

(58) Field of Classification Search
CPC ............. H04N 5/2257; H04N 1/00161; H04N 1/00167; H04N 1/00188; H04N 5/2621;
(Continued)

(56) References Cited

U.S. PATENT DOCUMENTS 5,950,031 A * 9/1999 Yamagata ............... G03B 17/48
348/64
6,185,321 B1 * 2/2001 Fukushima ........ H04N 1/00843
382/135
(Continued)

FOREIGN PATENT DOCUMENTS

| JP | H11275493 A | 10/1999 |
| JP | 2002-176607 A | 6/2002 |
| JP | 2004-072146 A | 3/2004 |

OTHER PUBLICATIONS

The extended European search report issued by the European Patent Office dated May 9, 2018, which corresponds to European Patent Application No. 17203165.0-1202 and is related to U.S. Appl. No. 15/830,030.

*Primary Examiner* — Chiawei Chen
(74) *Attorney, Agent, or Firm* — Studebaker & Brackett PC

(57) ABSTRACT

There are provided a printer, a digital camera with a printer, and a printing method which are capable of simply printing a desired image. In the digital camera with a printer, a first storage area and a second storage area are provided in storage areas of an internal memory. A printed image is recorded in the first storage area. A captured image is recorded in the second storage area. A first playback mode and a second playback mode are provided as a playback mode. In a case where the first playback mode is selected, the image recorded in the first storage area is played, and in a case where the second playback mode is selected, the image recorded in the second storage unit is played. The image being played is printed according to a print instruction.

20 Claims, 24 Drawing Sheets

(51) Int. Cl.
*H04N 5/232* (2006.01)
*H04N 5/262* (2006.01)

(52) U.S. Cl.
CPC ..... *H04N 1/00167* (2013.01); *H04N 1/00188* (2013.01); *H04N 5/23293* (2013.01); *H04N 5/2621* (2013.01); *H04N 2201/001* (2013.01); *H04N 2201/0082* (2013.01)

(58) Field of Classification Search
CPC ........... H04N 1/00148; H04N 5/23293; H04N 2201/0082; H04N 2201/001; G06K 15/1817; G06K 15/1856; G06K 15/1806; G03B 17/50; G03B 17/52; G03B 17/53
See application file for complete search history.

(56) References Cited

U.S. PATENT DOCUMENTS

| | | | | |
|---|---|---|---|---|
| 6,188,807 | B1* | 2/2001 | Arakawa | H04N 1/00204 358/407 |
| 6,570,667 | B1* | 5/2003 | Hattori | H04N 1/00278 358/1.15 |
| 6,791,601 | B1* | 9/2004 | Chang | H04N 7/18 348/620 |
| 6,945,717 | B2* | 9/2005 | Hata | B41J 29/393 400/61 |
| 9,998,625 | B2* | 6/2018 | Matsuda | H04N 1/32448 |
| 2002/0030827 | A1* | 3/2002 | Kotaka | H04N 1/0096 358/1.1 |
| 2004/0066455 | A1* | 4/2004 | Holmes | H04N 5/222 348/207.1 |
| 2005/0001024 | A1* | 1/2005 | Kusaka | H04N 1/00281 235/375 |
| 2005/0088527 | A1* | 4/2005 | Silverbrook | H04N 1/00278 348/207.2 |
| 2005/0253930 | A1* | 11/2005 | Endo | H04N 1/00278 348/207.1 |
| 2006/0092447 | A1* | 5/2006 | Narusawa | G06K 15/02 358/1.13 |
| 2006/0176509 | A1* | 8/2006 | Aoki | H04N 1/00209 358/1.15 |
| 2007/0013963 | A1* | 1/2007 | Nakamura | H04N 1/00127 358/403 |
| 2007/0041032 | A1* | 2/2007 | Sugimoto | H04N 1/00347 358/1.14 |
| 2007/0097229 | A1* | 5/2007 | Matsubara | H04N 1/00132 348/231.2 |
| 2007/0097255 | A1* | 5/2007 | Dalton | H04N 5/232 348/373 |
| 2007/0150682 | A1* | 6/2007 | Ogasawara | G06F 21/6218 711/163 |
| 2007/0150968 | A1* | 6/2007 | Chiba | H04N 1/00846 726/31 |
| 2008/0040712 | A1* | 2/2008 | Tanaka | G06F 8/65 717/168 |
| 2009/0268225 | A1* | 10/2009 | Sugiyama | G06F 3/1203 358/1.14 |
| 2012/0140287 | A1* | 6/2012 | Kawaguchi | G06K 15/1817 358/1.16 |
| 2013/0194609 | A1* | 8/2013 | Tanaka | G06K 15/4095 358/1.14 |
| 2015/0103204 | A1* | 4/2015 | Suzuki | H04N 5/772 348/231.3 |
| 2015/0143506 | A1* | 5/2015 | Sugano | G06F 21/85 726/17 |
| 2016/0077921 | A1* | 3/2016 | Yoshinari | G06F 11/1451 714/19 |
| 2017/0078566 | A1* | 3/2017 | Ota | H04N 5/23229 |
| 2017/0242123 | A1* | 8/2017 | Yamazaki | G01S 7/4808 |
| 2017/0280005 | A1* | 9/2017 | Matsuda | H04N 1/32448 |
| 2018/0011389 | A1* | 1/2018 | Baciu | H04N 5/2252 |

* cited by examiner

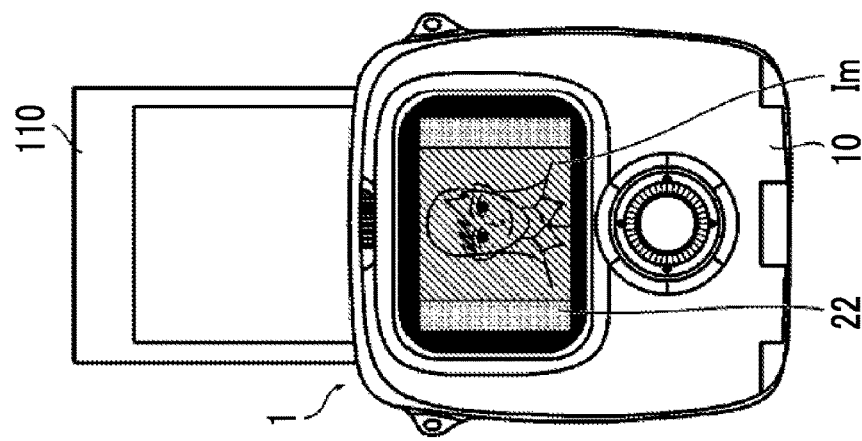
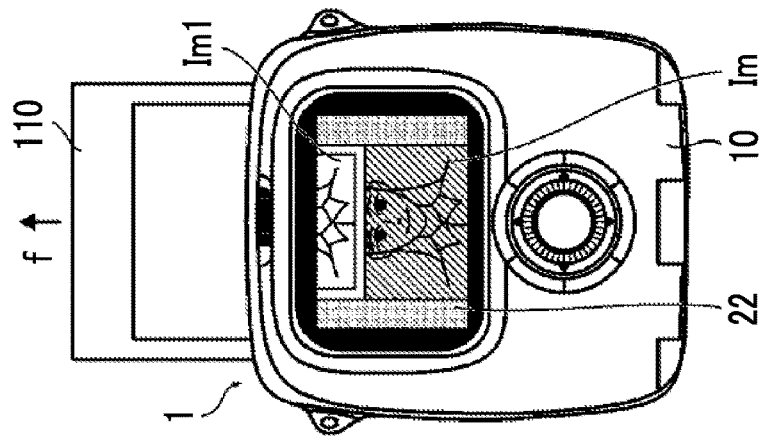
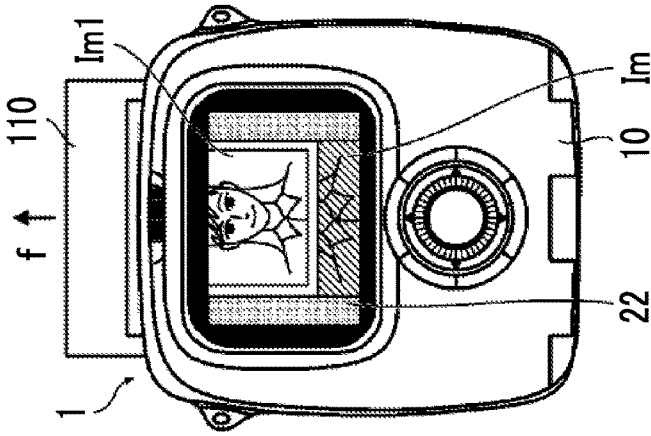
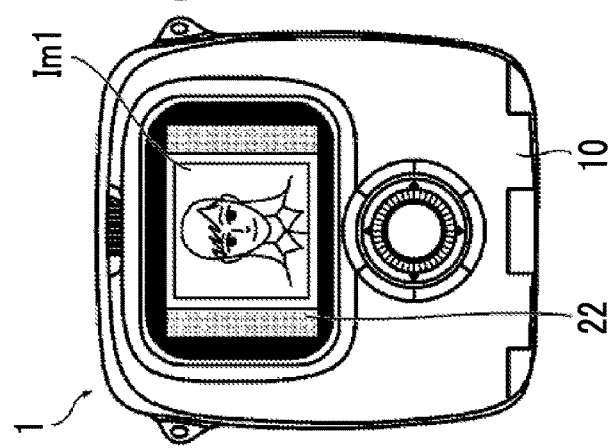

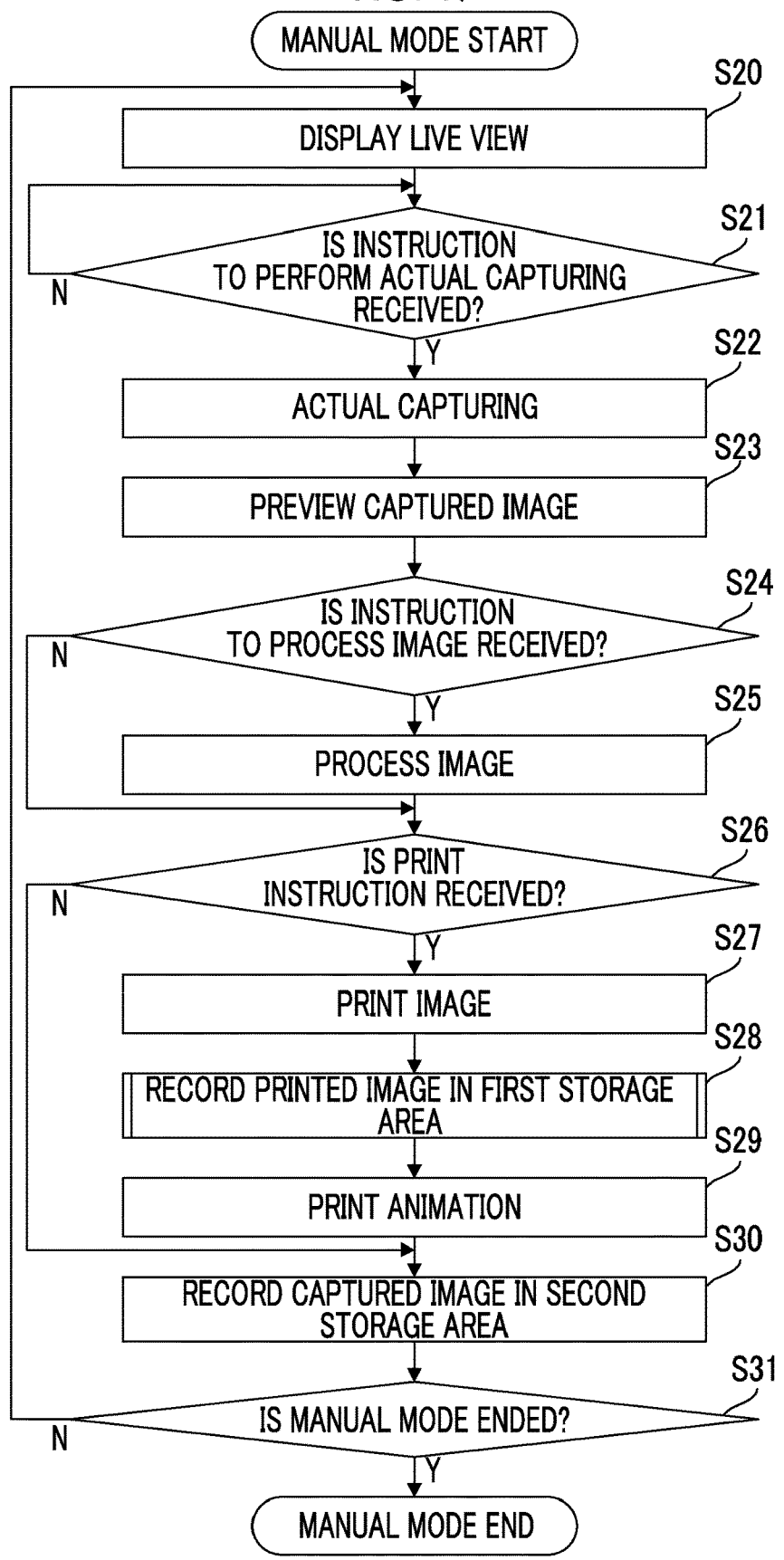

PRINTER, DIGITAL CAMERA WITH PRINTER, AND PRINTING METHOD

CROSS-REFERENCE TO RELATED APPLICATIONS

The present application claims priority under 35 U.S.C. § 119 to Japanese Patent Application No. 2016-243287, filed on Dec. 15, 2016. Each of the above application(s) is hereby expressly incorporated by reference, in its entirety, into the present application.

BACKGROUND OF THE INVENTION

1. Field of the Invention

The present invention relates to a printer, a digital camera with a printer, and a printing method.

2. Description of the Related Art

A digital camera which includes a printer built in a camera body has been known as a digital camera with a printer. In the digital camera with a printer, a captured image may be printed and may also be recorded in a memory. Thus, the image is not immediately printed at the time of capturing, and the image recorded in the memory is printed later.

JP2002-176607A suggests a digital camera with a printer capable of determining whether or not an individual image recorded in a memory is printed by writing a predetermined identification signal in an image file of a printed image. In the digital camera with a printer described in JP2002-176607A, it is determined whether or not there is the identification signal in a case where the image is played, and information indicating that the image is printed is displayed on a screen in a case where it is determined that there is the identification signal. Thus, it is possible to determine that the image being played is printed.

JP2004-72146A suggests that it is possible to acquire information of an image recording location from a medium on which an image is printed by assigning an IC tag to the medium on which the image is printed and writing the information of the image recording location in the IC tag.

SUMMARY OF THE INVENTION

However, in the method of JP2002-176607A, it is necessary to search for a target image while checking the image recorded in the memory one by one in a case where the image is reprinted, and there is a disadvantage that it takes time and effort to reprint.

In the method of JP2004-72146A, in a case where the printed medium is not at hand, there is a disadvantage that the information of the image recording location is not acquired.

The present invention has been made in view of such circumstances, and it is an object of the present invention to provide a printer, a digital camera with a printer, and a printing method which are capable of simply reprinting a target image.

Means for solving the problems is as follows.

(1) There is provided a printer comprising: an image input unit that receives an image; a first storage unit that stores images; a second storage unit that stores images; and a recording control unit that records a printed image in the first storage unit, and records the image received by the image input unit in the second storage unit.

According to the present aspect, the first storage unit and the second storage unit are provided as the storage unit that stores the images. The printed image is recorded in the first storage unit. The image received from the image input unit is recorded in the second storage unit. In a case where the image is reprinted, since a target image may be searched for by using only the images recorded in the first storage unit as targets, it is possible to search for and reprint a target simply and efficiently.

(2) In the printer according to (1), in a case where a specified number of images are recorded in the first storage unit or in a case where a remaining capacity of the first storage unit is insufficient, the recording control unit removes an image of which a printing time point is the oldest from the first storage unit, and records a newly printed image in the first storage unit.

According to the present aspect, in a case where a predetermined number of images are recorded in the first storage unit or the remaining capacity of the first storage unit is insufficient, the image of which the printing time point is the oldest is removed, and the newly printed image is recorded. That is, the images are removed in order in which the printing time point is old, and the images recorded in the first storage unit are updated. Accordingly, it is possible to efficiently search for a target image. A case where the remaining capacity of the first storage unit is insufficient means that the remaining capacity of the first storage unit is smaller than a capacity of the newly recorded image. That is, the case where the remaining capacity of the first storage unit is insufficient means that the new image is not able to be recorded.

(3) In the printer according to (2), in a case where an image read out from the first storage unit is printed, the recording control unit updates only information of a printing time point of the printed image.

According to the present aspect, in a case where the image read out from the first storage unit is printed, only the information of the printing time point of the printed image is updated. Accordingly, it is possible to prevent the same image in duplicate from being recorded.

(4) In the printer according to any one of (1) to (3), the first storage unit has a storage capacity smaller than that of the second storage unit.

According to the present aspect, the first storage unit has the storage capacity smaller than that of the second storage unit. Accordingly, in a case where the same image is recorded, the number of images capable of being recorded in the first storage unit is smaller than that in the second storage unit. Accordingly, it is possible to restrict the number of images to be recorded in the first storage unit.

(5) In the printer according to any one of (1) to (4), copying of an image from the first storage unit to the second storage unit is permitted, and copying of an image from the second storage unit to the first storage unit is prohibited.

According to the present aspect, the copying of the image from the first storage unit to the second storage unit is permitted, and the copying of the image from the second storage unit to the first storage unit is prohibited. The image is able to be copied from the first storage unit to the second storage unit, and thus, the image recorded in the first storage unit is able to retreat to the second storage unit. Accordingly, it is possible to prevent a favorite image from being removed. It is possible to prohibit the copying of the image from the second storage unit to the first storage unit, and thus, it is possible to previously prevent the printed image from not being able to be managed.

(6) The printer according to any one of (1) to (5) further comprises: a display unit; a playback mode selection unit that selects a first playback mode or a second playback mode; a playback control unit that plays the image recorded in the first storage unit on the display unit in a case where the first playback mode is selected by the playback mode selection unit, and plays the image recorded in the second storage unit on the display unit in a case where the second playback mode is selected; and a print instruction unit that transmits an instruction to print an image being played.

According to the present aspect, it is possible to select the first playback mode or the second playback mode as the playback mode of the image. In a case where the first playback mode is selected, the image recorded in the first storage unit is played on the display unit. In a case where the second playback mode is selected, the image recorded in the second storage unit is played. It is possible to transmit the instruction to print the image being played in both the modes. Accordingly, it is possible to print the target image simply and efficiently.

(7) In the printer according to (6), the playback control unit plays the images recorded in the first storage unit in order in which a printing time point is new in a case where the first playback mode is selected.

According to the present aspect, in a case where the images recorded in the first storage unit are played, the images are played in order in which the printing time point is new. Accordingly, it is possible to preferentially play the image to be repeatedly reprinted, and it is possible to more efficiently search for the target image.

(8) The printer according to (6) or (7) further comprises: a processing instruction unit that transmits an instruction to process an image being played; and an image processing unit that processes an image being played according to the instruction to process the image from the processing instruction unit.

According to the present aspect, it is possible to process the image being played.

(9) In the printer according to (8), the image processing unit performs at least one of a vignetting process, an effect process, or brightness changing, as image processing.

According to the present aspect, it is possible to perform at least one of the vignetting process, the effect process, or the brightness changing on the image being played.

(10) In the printer according to any one of (1) to (9), an internal memory functions as the first storage unit and the second storage unit.

According to the present aspect, one internal memory functions as the first storage unit and the second storage unit. In this case, one storage area of the internal memory functions as the first storage unit, and the other storage area functions as the second storage unit. Accordingly, it is possible to simplify the configuration.

(11) In the printer according to any one of (1) to (9), an internal memory functions as the first storage unit, and a detachable and attachable external memory functions as the second storage unit.

According to the present aspect, the internal memory functions as the first storage unit, and the detachable and attachable external memory functions as the second storage unit. The detachable and attachable external memory functions as the second storage unit, and thus, it is possible to easily cope with even a case where the number of images to be received increases.

(12) In the printer according to any one of (1) to (11), the image input unit receives an image from an external device through communication.

According to the present aspect, it is possible to receive the image from the external device through communication.

(13) There is provided a digital camera with a printer comprising: the printer according to any one of (1) to (12); and a capturing unit that includes a capturing optical system and an image sensor. The image input unit receives an image captured by the capturing unit.

According to the present aspect, it is possible to capture the image. It is possible to record and print the captured image. The captured image is recorded in the second storage unit. In a case where the captured image is printed, the printed image is also recorded in the first storage unit.

(14) The digital camera with a printer according to (13) further comprises: a capturing mode selection unit that selects a first capturing mode or a second capturing mode. In a case where the first capturing mode is selected by the capturing mode selection unit, the image captured by the capturing unit is automatically printed.

According to the present aspect, it is possible to select the first capturing mode or the second capturing mode as the capturing mode. In a case where the first capturing mode is selected, the captured image is automatically printed. Accordingly, in this case, the captured image is automatically recorded in the first storage unit and the second storage unit.

(15) There is provided a printing method of a printer that includes an image input unit which receives an image, a first storage unit which stores images, and a second storage unit which stores images. The method comprises: a step of printing an image received from the image input unit, an image read out from the first storage unit, or an image read out from the second storage unit; a step of recording the printed image in the first storage unit; and a step of recording the image received from the image input unit in the second storage unit.

According to the present aspect, in a case where the image is received, the received image is recorded in the second storage unit. In a case where the image is printed, the printed image is recorded in the first storage unit. In a case where the image is reprinted, since a target image may be searched for by using only the images recorded in the first storage unit as targets, it is possible to search for and reprint a target simply and efficiently.

(16) In the printing method according to (15), in the step of recording the printed image in the first storage unit, an image of which a printing time point is the oldest is removed from the first storage unit, and a newly printed image is recorded in the first storage unit in a case where a specified number of images are recorded in the first storage unit or a remaining capacity of the first storage unit is insufficient.

According to the present aspect, in a case where a predetermined number of images are recorded in the first storage unit or in a case where the remaining capacity of the first storage unit is insufficient, the image of which the printing time point is the oldest is removed, and the newly printed image is recorded. That is, the images are removed in order in which the printing time point is old, and the images recorded in the first storage unit are updated. Accordingly, it is possible to efficiently search for a target image. A case where the remaining capacity of the first storage unit is insufficient means that the remaining capacity of the first storage unit is smaller than a capacity of the newly recorded image. That is, the case where the remaining capacity of the first storage unit is insufficient means that the new image is not able to be recorded.

(17) In the printing method according to (16), in the step of recording the printed image in the first storage unit, only information of a printing time point of the printed image is updated in a case where the image read out from the first storage unit is printed.

According to the present aspect, in a case where the image read out from the first storage unit is printed, only the information of the printing time point of the printed image is updated. Accordingly, it is possible to prevent the same image in duplicate from being recorded.

According to the present invention, it is possible to simply reprint a target image.

BRIEF DESCRIPTION OF THE DRAWINGS

FIGS. 16A to 16D are diagrams showing the transition of the screen display of the monitor in a case where a print animation process is performed.

FIG. 17 is a flowchart showing a process procedure in a manual mode.

DESCRIPTION OF THE PREFERRED EMBODIMENTS

Hereinafter, a preferred embodiment of the present invention will be described in detail with reference to the accompanying drawings.

Digital Camera with Printer

External Appearance Configuration

FIGS. 1 to 4 are a front perspective view, a rear perspective view, a front view, and a rear view showing an embodiment of a digital camera with a printer, respectively.

Figure 1:
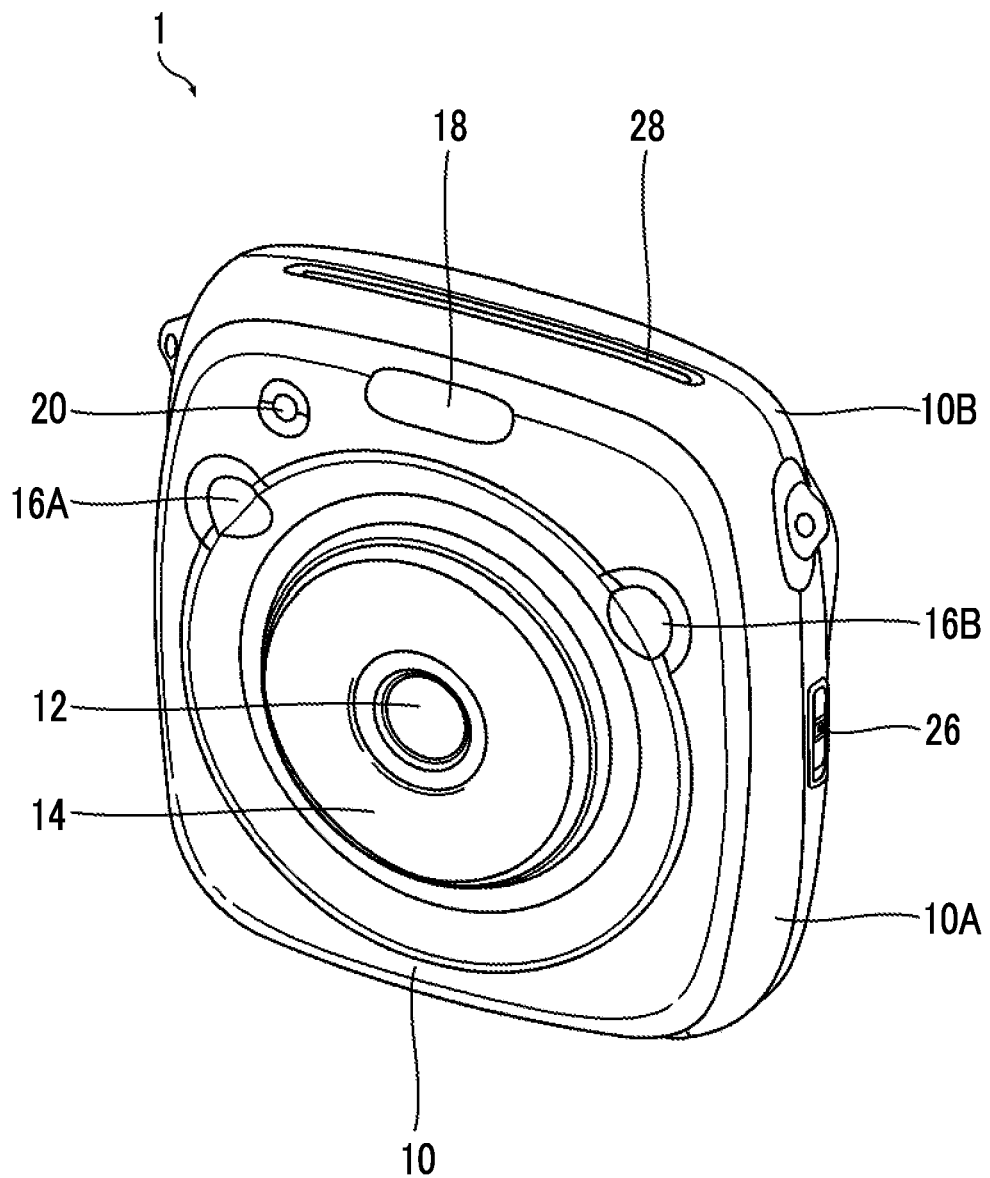
FIG. 1 is a front perspective view showing an embodiment of a digital camera with a printer.
Figure 2:
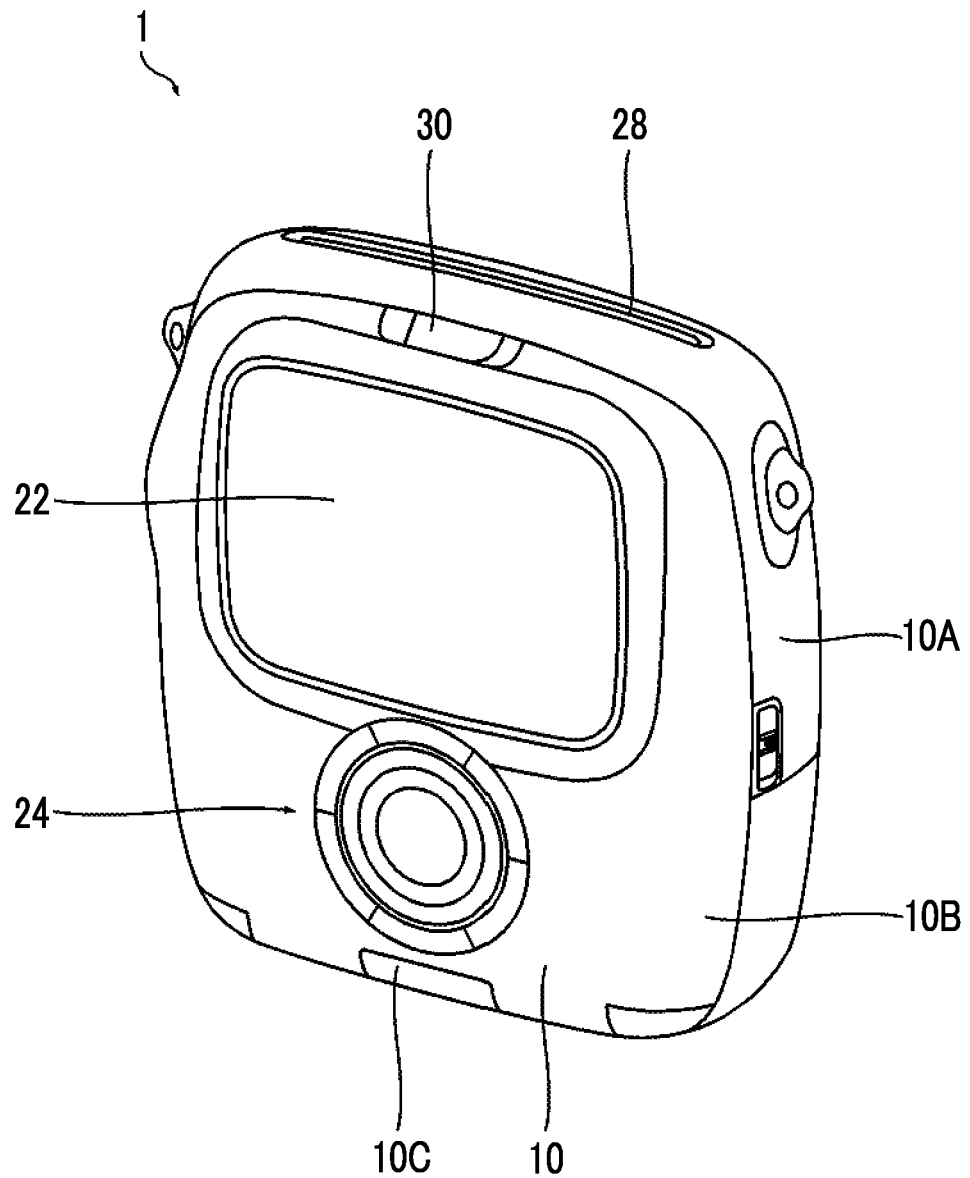
FIG. 2 is a rear perspective view showing the embodiment of the digital camera with a printer.
Figure 3:
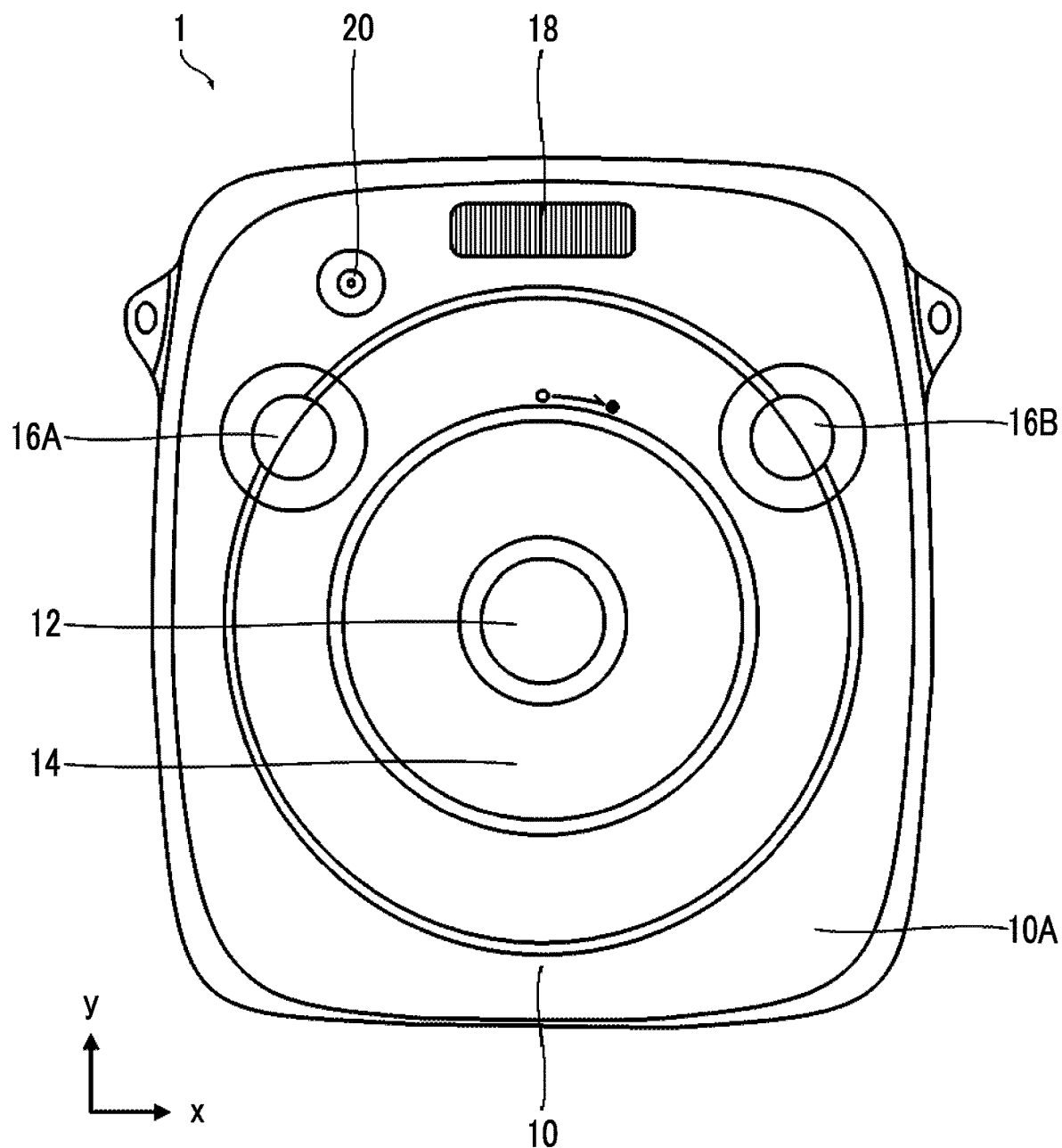
FIG. 3 is a front view showing the embodiment of the digital camera with a printer.
Figure 4:
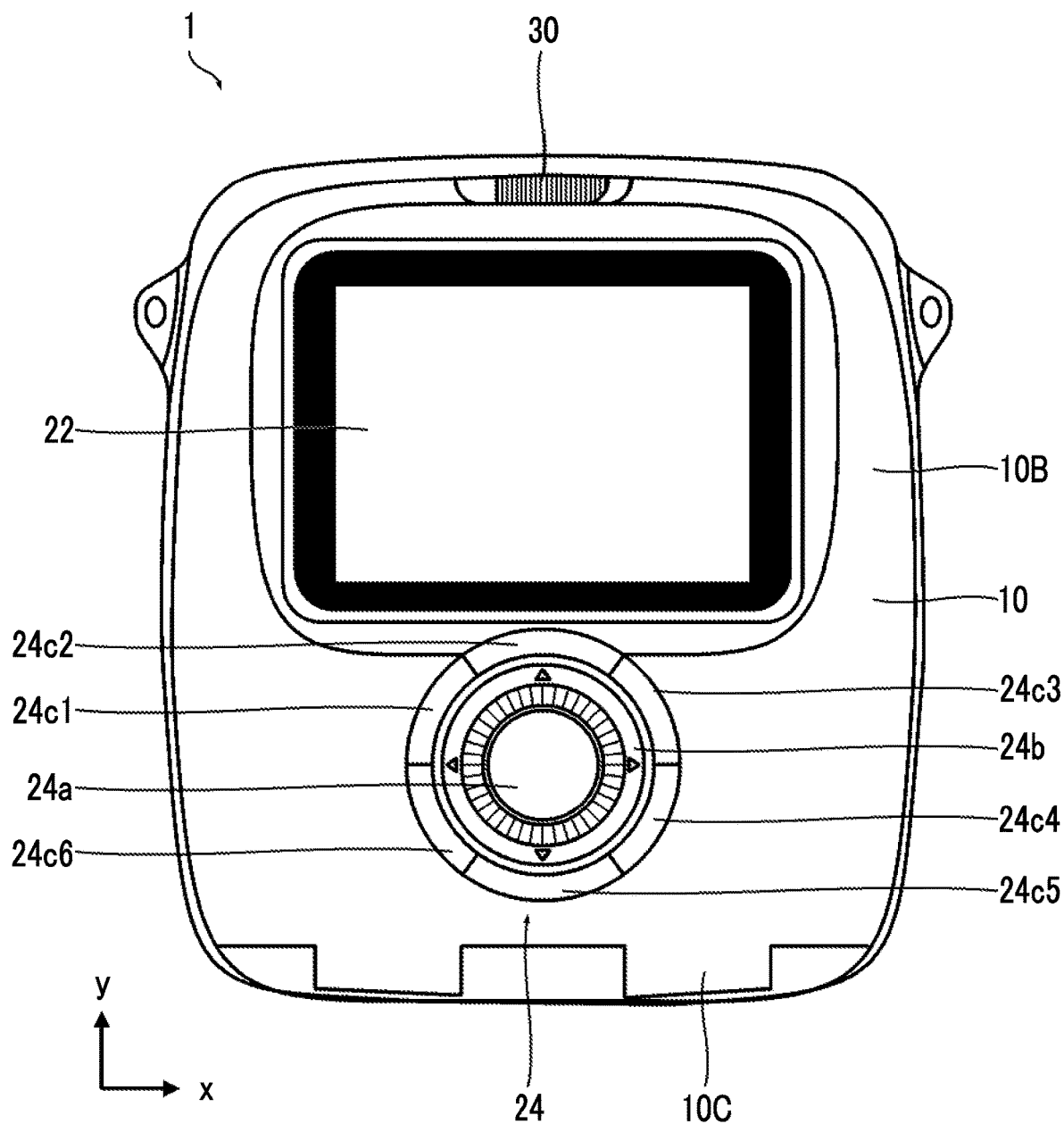
FIG. 4 is a rear view showing the embodiment of the digital camera with a printer.

A digital camera with a printer 1 shown in FIGS. 1 to 4 is a digital camera with a printer that uses an instant film as a medium for printing. In FIGS. 3 and 4, it is assumed that a direction represented by an arrow x is a leftward and rightward direction and a direction represented by an arrow y is an upward and downward direction. The leftward and rightward direction is a synonym for a horizontal direction or a width direction. The upward and downward direction is a synonym for a height direction.

The digital camera with a printer 1 includes a portable camera body 10. The camera body 10 includes an imaging lens 12, a power ring 14, a first release button 16A, a second release button 16B, a flash 18, and an auxiliary light lamp 20 which are provided in the front. The camera body 10 includes a monitor 22 and a rear operation unit 24 which are provided at the rear. The camera body 10 includes a capturing mode switching lever 26 which is provided on the right side and a print ejection port 28 which is provided at the top.

Camera Body

The camera body 10 has a rounded flat block shape as a whole. The camera body 10 has a bilaterally symmetrical shape as a whole so as to be gripped with either of the left and right hands.

The camera body 10 includes a main body 10A and a back cover 10B. The back cover 10B constitutes the rear of the camera body 10, and is provided so as to be opened and closed with respect to the main body 10A through a hinge 10C. A back cover locking mechanism that locks the back cover 10B is provided at the main body 10A. In a case where the back cover is closed, the back cover 10B is automatically locked by the back cover locking mechanism. The back cover is unlocked by a sliding type unlocking lever 30 provided at the back cover 10B. However, the unlocking lever is not able to be operated during the printing. That is, the unlocking lever is forcibly locked such that the back cover 10B is not opened during the printing.

Imaging Lens

The imaging lens 12 is arranged in a substantially central position in the front of the camera body 10. The imaging lens 12 is a unifocal lens.

Power Ring

The power ring 14 is an operation member that powers on and off the digital camera with a printer 1. The power ring 14 has a ring shape, and is arranged on the same axis as that of the imaging lens 12. The power ring 14 is rotated around the imaging lens 12, and powers on and off the digital camera with a printer 1. Since a movable range of the power ring 14 is restricted, the power of the digital camera with a printer 1 is powered on in a case where the power ring rotates up to one end of the movable range, and the power of the digital camera with a printer 1 is powered off in a case where the power ring rotates up to the other end of the movable range.

First Release Button and Second Release Button

The first release button 16A and the second release button 16B are operation members for transmitting an instruction to capture an image, and are examples of a capturing instruction unit. The first release button 16A and the second release button 16B are provided in the front of the camera body 10, and are arranged so as to be bilaterally symmetric with respect to each other. The first release button 16A and the second release button 16B are so-called two-stage stroke type push buttons capable of being "half push" operated and "fully push" operated. The digital camera with a printer 1 performs capturing preparation by operating the half push of the first release button 16A or the second release button 16B, and performs actual capturing by operating the fully push of the first or second button. The actual capturing is capturing for recording an image.

Flash

The flash 18 is provided in the front of the camera body 10, and is arranged substantially directly above the imaging lens 12. The flash 18 is a xenon tube.

Auxiliary Light Lamp

The auxiliary light lamp 20 is a lamp that emits auxiliary light for autofocus (AF). The auxiliary light lamp 20 emits the light in a case where capturing is performed under a dark environment, and is used as the auxiliary light for AF. The auxiliary light lamp 20 is a light emitting diode (LED), and is provided in the front of the camera body 10.

Monitor

The monitor 22 is an example of a display unit. The monitor 22 is a color liquid crystal display (LCD). The monitor 22 is provided at the rear of the camera body 10. The monitor 22 is a so-called wide monitor, and includes a horizontally long screen.

Rear Operation Unit

The rear operation unit 24 includes an OK button 24a, a command dial 24b, and six function buttons 24c1 to 24c6. The OK button 24a, the command dial 24b, and the six function buttons 24c1 to 24c6 are arranged so as to be concentric, and constitute a circular operation unit as a whole. The rear operation unit 24 is provided at the rear of the camera body 10. Both the monitor 22 and the rear operation unit 24 are arranged in the center at the rear of the camera body 10 in the width direction, and are vertically arranged. Particularly, the rear operation unit 24 is arranged in a position where the rear operation unit is able to be operated with the thumb of the hand that grasps the camera body 10, and is arranged so as to be bilaterally symmetric such that the rear operation unit is able to be operated with the substantially same feeling of operation with either the left and right hands.

OK Button

The OK button 24a is a button for transmitting an instruction to input OK for an inquiry. The OK button 24a is a circular push button, and is arranged in the center of the rear operation unit 24.

The OK button 24a also functions as a confirmation button or a menu button. The confirmation button is a button for confirming the selected item. The menu button is a button for calling a menu screen on the monitor 22.

Command Dial

The command dial 24b is a ring-shaped touch sensor, and is rotated by passing the finger across the surface thereof along the circle. The command dial 24b also functions as a cross key, and is able to be pushed in four upward, downward, leftward, and rightward directions. The command dial 24b is an example of a rotary dial functioning as direction keys.

The command dial 24b is arranged on the same axis as that of the OK button 24a, and the OK button 24a is arranged in an inner circumference of the command dial 24b. Accordingly, it is possible to operate the command dial 24b and the OK button 24a with the thumb of the hand that grips the camera body 10, and it is possible to provide favorable operability.

Function Buttons

The six function buttons 24c1 to 24c6 are arranged in the same circumference, and constitute one circle as a whole. The buttons have the same shape, and have a shape in which the ring is equally split into six. Each button is a push button.

The first function button 24c1 functions as a vignetting button. Hereinafter, the first function button 24c1 is referred to as the vignetting button. The vignetting button is a button for transmitting an instruction to perform the vignetting process on an image being played. The vignetting process is a process of reducing the brightness at an edge part of the image.

The second function button 24c2 functions as an effect button. Hereinafter, the second function button 24c2 is referred to as the effect button. The print button is a button for transmitting an instruction to perform an effect process an image being played. The effect process is a process of giving a certain effect to the image, and corresponds to, for example, a process of changing the tone of the image or blurring the image.

The third function button 24c3 functions as a brightness button. Hereinafter, the third function button 24c3 is referred to as the brightness button. The brightness button is a button for transmitting an instruction to change the brightness of an image being played.

In the digital camera with a printer 1 of the present embodiment, the vignetting button 24c1, the effect button 24c2, and the brightness button 24c3 constitute a processing instruction unit.

The fourth function button 24c4 functions as a print button. Hereinafter, the fourth function button 24c4 is referred to as the print button. The print button is a button for transmitting an instruction to print an image being displayed on the monitor 22. Accordingly, in the digital camera with a printer 1 of the present embodiment, the print button constitutes a print instruction unit.

The fifth function button 24c5 functions as a back button. Hereinafter, the fifth function button 24c5 is referred to as the back button. The back button is a button for transmitting an instruction to return the image in an immediately previous state. Since the image is returned to be in the immediately previous state, the selected item or the instructed item is canceled. Accordingly, the back button 24c5 also functions as a cancel button.

The sixth function button 24c6 functions as a playback button. Hereinafter, the sixth function button 24c6 is referred to as the playback button. The playback button is a button for transmitting an instruction to switch the digital camera with a printer to a playback mode. In a case where the playback button 24c6 is pushed in a state in which the digital camera with a printer is set in the capturing mode, the digital camera with a printer 1 is switched to the playback mode.

The switching from the playback mode to the capturing mode is performed by operating the first release button 16A or the second release button 16B. That is, in a case where the first release button 16A or the second release button 16B is pushed in a state in which the digital camera with a printer 1 is set in the playback mode, the digital camera with a printer is switched to the capturing mode.

Capturing Mode Switching Lever

The capturing mode switching lever 26 is an operation member for switching the capturing mode. The capturing mode switching lever 26 is an example of a capturing mode selection unit. The capturing mode switching lever 26 is a sliding type switch, and is provided on the right side of the camera body 10.

The capturing mode switching lever 26 is operated to be slid, and the capturing mode is set to an "auto mode" which is a first capturing mode in a case where the capturing mode switching lever is set in an "auto position". The capturing mode is set to a "manual mode" which is a second capturing mode in a case where the capturing mode switching lever is set in a "manual position". The auto mode (first capturing mode) is a mode in which the captured image is automatically printed in a case where the capturing is performed. The manual mode (second capturing mode) is a mode in which the captured image is printed according to the instruction from the user.

Print Ejection Port

The print ejection port 28 is an ejection port of the printed instant film. The print ejection port 28 is a slit through which the instant film is able to pass, and is provided in the center at the top of the camera body 10 in the width direction. An instant film 110 is ejected directly upwards from the print ejection port 28.

Internal Mechanical Configuration

Figure 5:
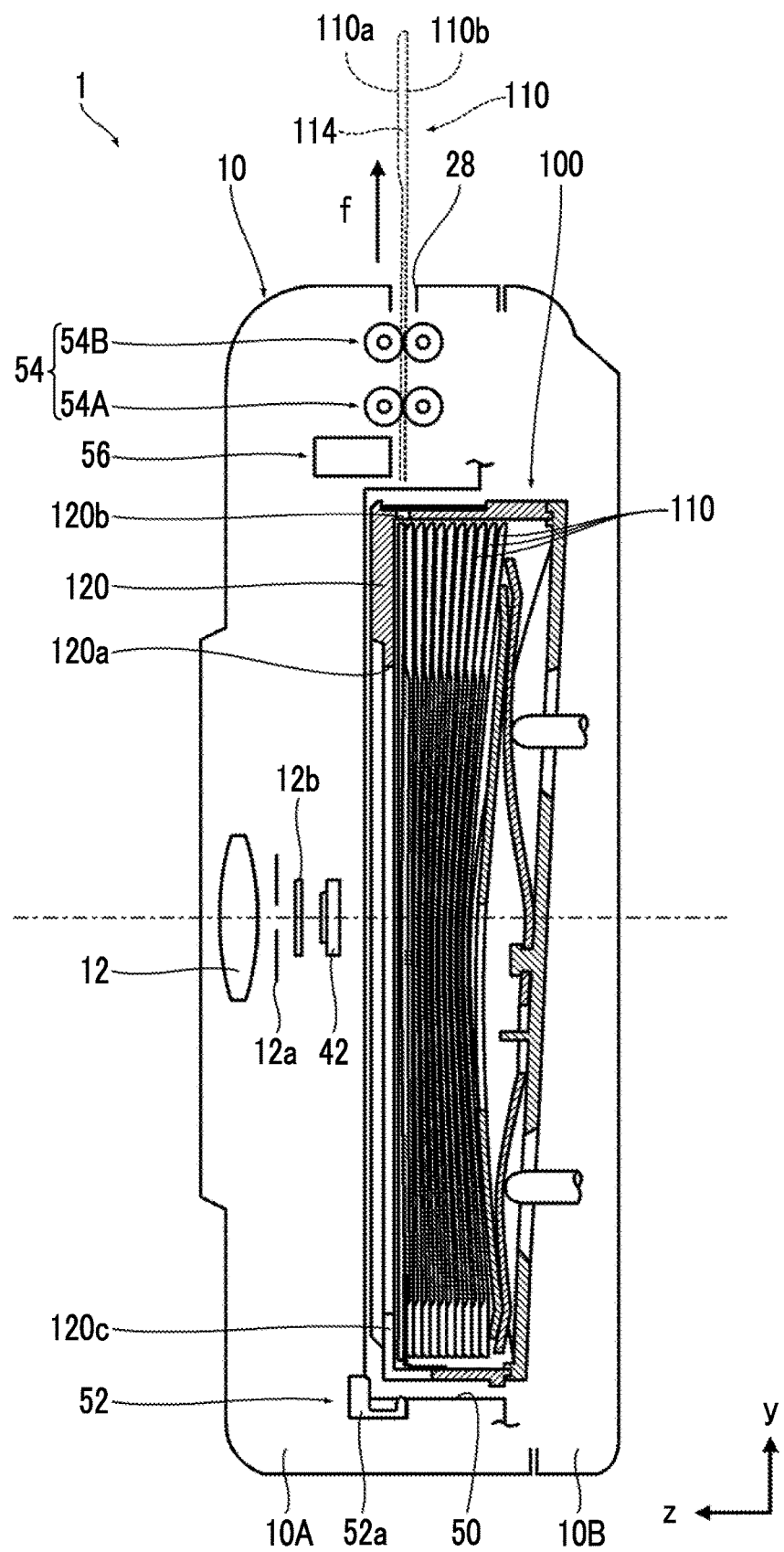
FIG. 5 is a diagram showing an internal mechanical configuration of the digital camera with a printer.

FIG. 5 is a diagram showing an internal mechanical configuration of the digital camera with a printer. FIG. 5 shows only the configuration of main units. It is assumed in FIG. 5 that a direction represented by an arrow z is a thickness direction of the digital camera with a printer 1.

As the configuration related to the digital camera, the imaging lens 12 and an image sensor 42 are provided within the digital camera with a printer 1. As the configuration related to the printer, an instant film pack 100, a film loading room 50, a film delivery mechanism 52, a film transport mechanism 54, and a print head 56 are provided.

Configuration Related to Digital Camera

Imaging Lens

The imaging lens 12 is an example of a capturing optical system. The imaging lens 12 is constituted by a plurality of lenses including a focus lens. In FIG. 5, only one lens is shown for simplicity of illustration. A focal length of the imaging lens 12 is adjusted by moving the focus lens back and forth along an optical axis.

A stop 12a and a shutter 12b are provided in the imaging lens 12. The light amount of light passing through the imaging lens 12 is adjusted by the stop 12a. The light passing through the imaging lens 12 is shielded by the shutter 12b.

Image Sensor

For example, the image sensor 42 is a two-dimensional solid image pickup element such as a charge coupled device (CCD) image sensor or a complementary metal oxide semiconductor (CMOS) image sensor. The image sensor 42 includes an image pickup area having an aspect ratio corresponding to a printable area of the instant film to be used.

In the digital camera with a printer 1 of the present embodiment, the imaging lens 12 and the image sensor 60 constitute a capturing unit.

Configuration Related to Printer

Instant Film Pack

The instant film pack 100 has a structure in which a plurality of instant films 110 is accommodated in a case 120.

Figure 6:
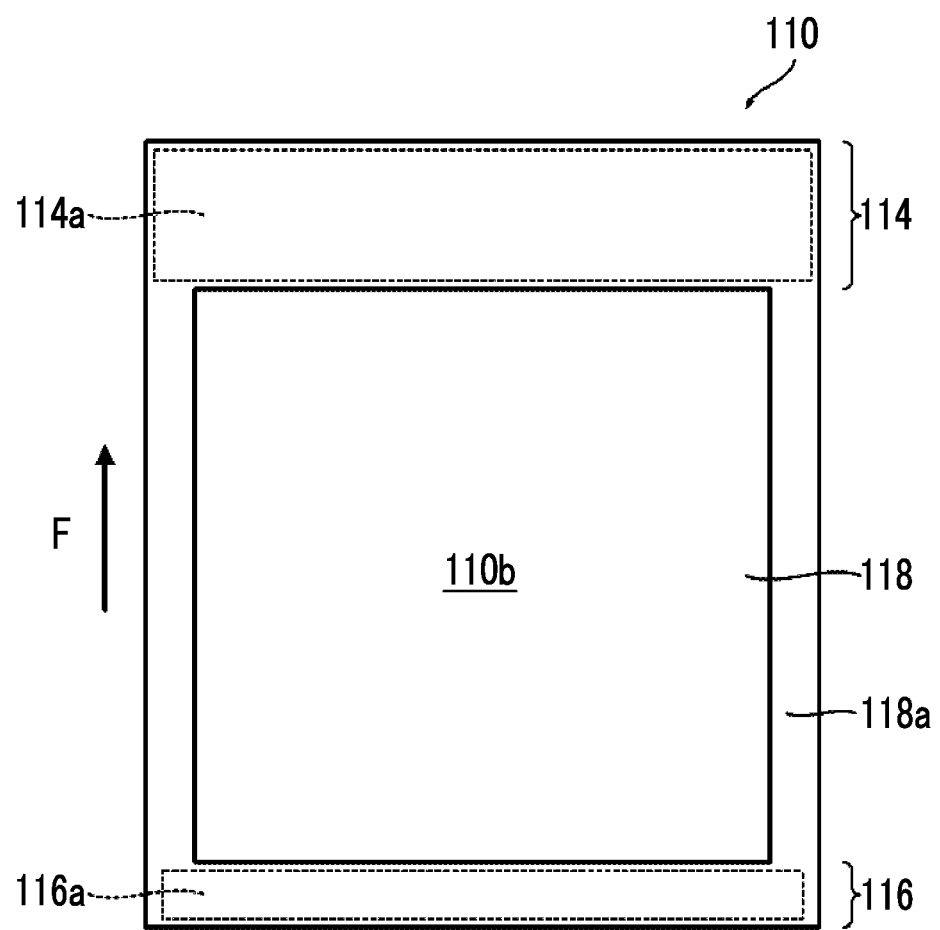
FIG. 6 is a front view of an instant film.
Figure 7:
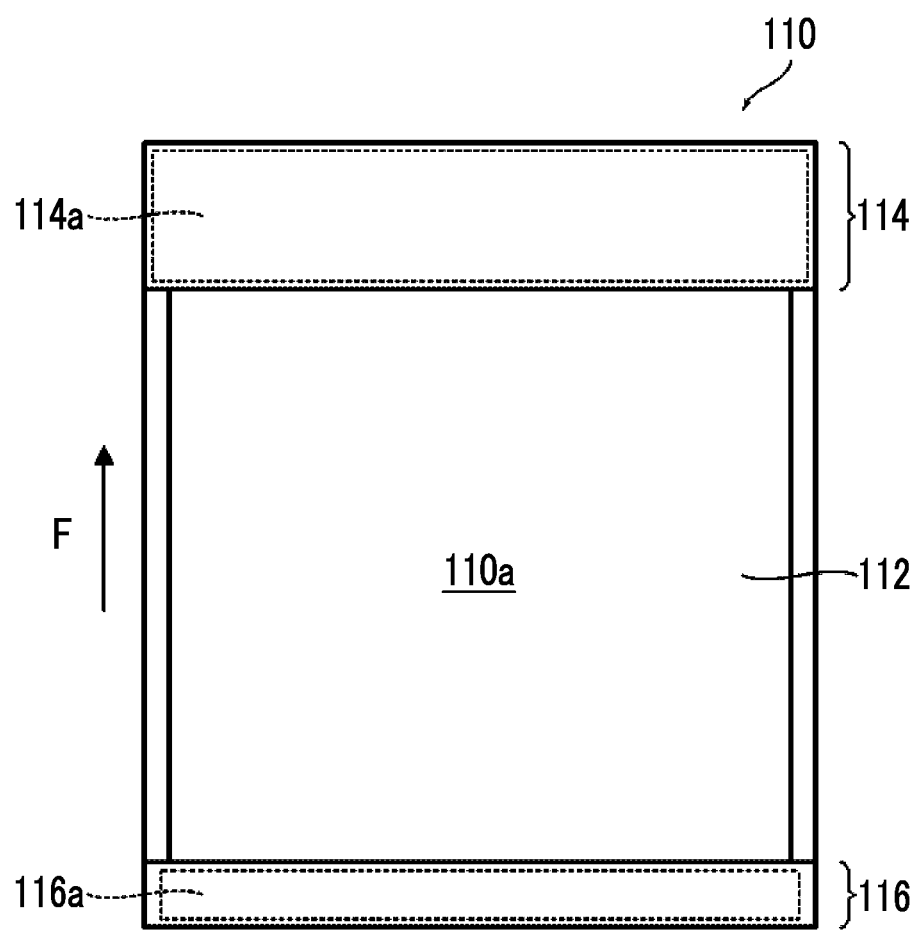
FIG. 7 is a rear view of the instant film.

FIG. 6 is a front view of the instant film. FIG. 7 is a rear view of the instant film.

In FIGS. 6 and 7, a direction represented by an arrow F is a utilization direction of the instant film 110. That is, the instant film 110 is sent toward the direction represented by the arrow F, and the instant film 110 is used. Accordingly, in a case where the instant film is loaded into the digital camera with a printer 1, the direction represented by the arrow F is an ejection direction of the instant film 110.

The instant film 110 has a rectangular card shape. The instant film 110 includes an exposure surface 110a which is a rear surface and an observation surface 110b which is a front surface. The exposure surface 110a is a surface on which an image is recorded through exposure, and the observation surface 110b is a surface through which the recorded image is observed.

As shown in FIG. 7, an exposure part 112, a pod part 114, and a trap part 116 are provided on the exposure surface 110a of the instant film 110.

The exposure part 112 is a part in which an image is recorded through exposure. The exposure part 112 is a printable area of the instant film 110. The pod part 114 and the trap part 116 are arranged on front and rear sides with the exposure part 112 interposed therebetween. The instant film 110 of the present embodiment includes a square-shaped exposure part 112 of which an aspect ratio is 1:1.

The pod part 114 is arranged on the front side of the exposure part 112 in the utilization direction F. A development treatment liquid pod 114a that contains a development treatment liquid is provided within the pod part 114.

The trap part 116 is arranged on the rear side of the exposure part 112 in the utilization direction F. An absorbing material 116a is provided within the trap part 116.

As shown in FIG. 6, an observation part 118 is provided on the observation surface 110b of the instant film 110. The observation part 118 is a part in which the image is displayed. The image is displayed on the observation part 118 by performing a development treatment on the exposure part 112. The observation part 118 is arranged so as to correspond to the exposure part 112. A frame 118a is provided around the observation part 118. Accordingly, the image is displayed within the frame. An aspect ratio of the observation part 118 is 1:1 which is the same as that of the exposure part 112, and has a square shape.

The instant film 110 is observed in an orientation in which the trap part 116 is at the top and the pod part 114 is at the bottom. Accordingly, the image is printed in an orientation in which the trap part 116 is at the top and the pod part 114 is at the bottom.

The development treatment liquid of the pod part 114 spreads over the exposure part 112 after the exposure, and thus, the development treatment is performed on the instant film 110. The instant film 110 passes between roller pairs, and thus, the development treatment liquid of the pod part 114 is extruded from the pod part 114 and spreads over the exposure part 112. The development treatment liquid remaining after the spreading is trapped in the trap part 116.

The case 120 has a rectangular box shape. The case 120 includes an opening 120a for exposure which is provided in the front, and includes a slit-shaped ejection port 120b which is provided at the top. The instant films 110 are accommodated so as to overlap each other within the case in a state in which the exposure surface 110a faces the front of the case 120 and the pod part 114 faces the top of the case 120.

The case 120 includes a slit-shaped claw opening 120c in the bottom. A claw enters the claw opening 120c, and thus, the instant films 110 accommodated in the case 120 are sent toward the ejection port 120b one by one, and are ejected from the ejection port 120b.

Ten instant films 110 are accommodated in one instant film pack 100.

Film Loading Room

The film loading room 50 is a loading part of the instant film pack 100. The film loading room 50 is provided as a recess part capable of accommodating the instant film pack 100 in the main body 10A of the camera body 10. In a case where the back cover 10B of the camera body 10 is opened, the film loading room 50 is exposed, and the instant film pack 100 is able to be loaded.

Film Delivery Mechanism

The film delivery mechanism 52 delivers the instant films 110 from the instant film pack 100 loaded into the film loading room 50 one by one. The film delivery mechanism 52 includes a claw 52a that moves back and forth along a delivery direction of the instant film 110. The instant films 110 within the case are extracted by the claw 52a one by one, and the instant film 110 is delivered from the instant film pack 100.

Film Transport Mechanism

The film transport mechanism 54 transports the instant film 110 delivered from the instant film pack 100 by the film delivery mechanism 52 at a certain speed. The film transport mechanism 54 includes a transport roller pair 54A and a spreading roller pair 54B.

The transport roller pair 54A is rotated by being driven by a motor (not shown), and transports the instant film while clamping both sides of the instant film 110.

The spreading roller pair 54B is rotated by being driven by a motor (not shown), and transports the instant film 110 while clamping the entire instant film. The pod part 114 of the instant film 110 is pushed during the transporting, and the development treatment liquid spreads.

Print Head

The print head 56 records an image on the instant film 110 delivered from the instant film pack 100. The print head 56 is a line-type exposure head. The print head 56 irradiates the exposure surface 110a of the instant film 110 transported by the film transport mechanism 54 with print light for every line, and records the image on the instant film 110 in one pass.

Electric Configuration

Figure 8:
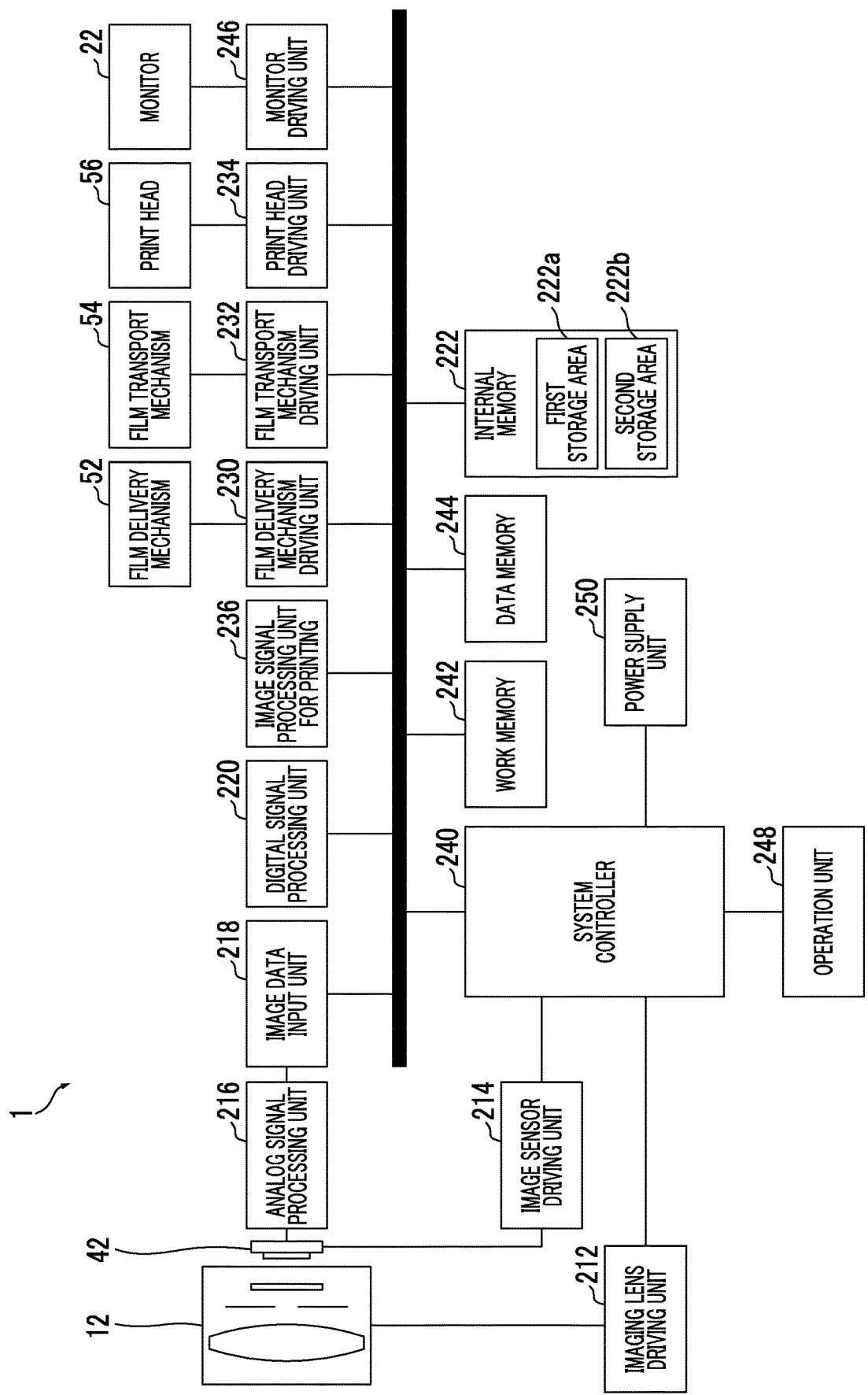
FIG. 8 is a diagram showing an electric configuration of the digital camera with a printer.

FIG. 8 is a diagram showing an electric configuration of the digital camera with a printer. FIG. 8 shows only the configuration of main units.

As the configuration related to the digital camera, the digital camera with a printer 1 includes the imaging lens 12, an imaging lens driving unit 212, the image sensor 42, an image sensor driving unit 214, an analog signal processing unit 216, an image data input unit 218, a digital signal processing unit 220, and an internal memory 222. As the configuration related to the printer, the digital camera with a printer includes the film delivery mechanism 52, a film delivery mechanism driving unit 230, the film transport mechanism 54, a film transport mechanism driving unit 232, the print head 56, a print head driving unit 234, and an image signal processing unit 236 for printing. As the configuration common to the digital camera and the printer, the digital camera with a printer includes a system controller 240, a work memory 242, a data memory 244, the monitor 22, a monitor driving unit 246, an operation unit 248, and a power supply unit 250. The system controller 240 functions as the overall control unit.

Configuration Related to Digital Camera

Imaging Lens Driving Unit

The imaging lens driving unit 212 is driving means of the imaging lens 12. The imaging lens driving unit 212 drives the focus lens, drives the stop 12a, and drives the shutter 12b. The imaging lens driving unit 212 drives the imaging lens 12 under the control of the system controller 240.

Image Sensor Driving Unit

The image sensor driving unit 214 is driving means of the image sensor 42. The image sensor driving unit 214 drives the image sensor 42 under the control of the system controller 240.

Analog Signal Processing Unit

The analog signal processing unit 216 receives a signal output from the image sensor 42, converts the received signal into a digital image signal by performing required signal processing such as correlative double sampling processing or amplification processing on the received signal, and outputs the converted digital image signal.

Image Data Input Unit

The image data input unit 218 is an example of an image input unit. The image data input unit 218 receives the digital image signal output from the analog signal processing unit 216 under the control of the system controller 240. One received image data item is stored in the work memory 242.

Digital Signal Processing Unit

The digital signal processing unit 220 performs required signal processing such as demosaicing, white balance correction, gamma correction, or contour correction on the image data stored in the work memory 242, and generates predetermined image data including luminance data (Y data) and color difference data items (Cr and Cb data items).

Internal Memory

For example, the internal memory 222 is a storage unit of the image, and a non-volatile memory such as electrically erasable programmable read only memory (EEPROM).

The internal memory 222 functions as a first storage unit and a second storage unit. The internal memory 222 has a first storage area 222a and a second storage area 222b in storage areas. The first storage area 222a constitutes the first storage unit, and the second storage area 222b constitutes the second storage unit. The printed image is recorded in the first storage area 222a, and the captured image is recorded in the second storage area 222b. The details thereof will be described below.

Configuration Related to Printer

Film Delivery Mechanism Driving Unit

The film delivery mechanism driving unit 230 is driving means of the film delivery mechanism 52. The film delivery mechanism driving unit 230 drives the claw 52a under the control of the system controller 240.

Film Transport Mechanism Driving Unit

The film transport mechanism driving unit 232 is driving means of the film transport mechanism 54. The film transport mechanism driving unit 232 drives the transport roller pair 54A and the spreading roller pair 54B such that these roller pairs are rotated according to a command from the system controller 240.

Print Head Driving Unit

The print head driving unit 234 is driving means of the print head 56. The print head driving unit 234 drives the print head 56 under the control of the system controller 240.

Image Signal Processing Unit for Printing

The image signal processing unit 236 for printing generates image data for printing under the control of the system controller 240. The image data for printing is image data to be recorded on the instant film 110 by the print head 56. The print head 56 is driven based on the image data for printing generated by the image signal processing unit 236 for printing, and records the image on the instant film 110.

Configuration Common to Digital Camera and Printer

System Controller

The system controller 240 is the overall control unit of the digital camera with a printer 1. The system controller 240 is a computer, and provides various functions by executing a predetermined program.

Particularly, the system controller 240 executes a predetermined program, and thus, the digital camera with a printer 1 of the present embodiment functions a recording control unit 240*a*, a playback control unit 240*b*, an image processing unit 240*c*, a capturing control unit 240*d*, and a print control unit 240*e*.

Figure 9:
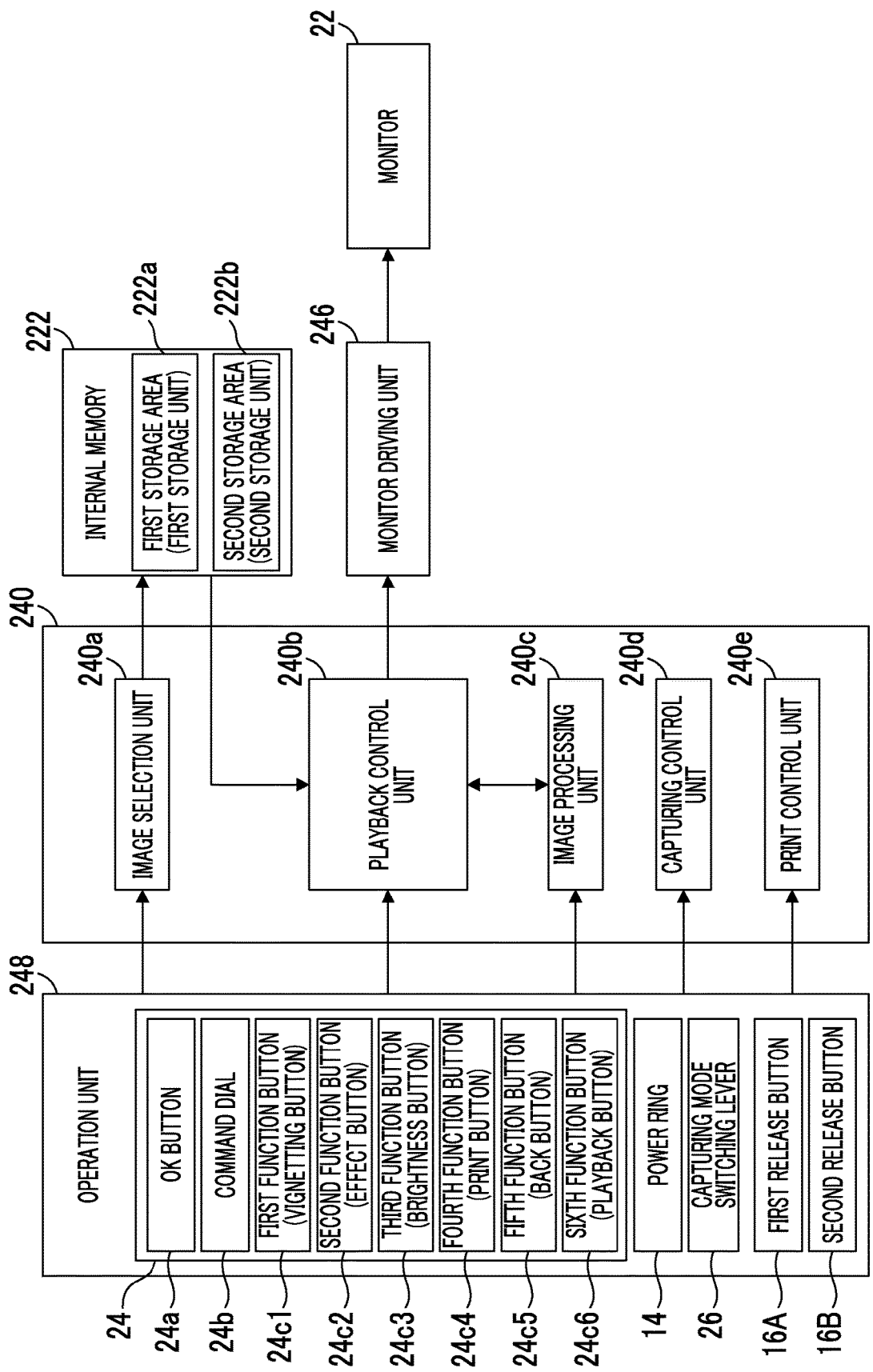
FIG. 9 is a block diagram of main functions implemented by a system controller.

FIG. 9 is a block diagram of the main functions implemented by the system controller.

Recording Control Unit

The recording control unit 240*a* performs a process of recording the image in the internal memory 222.

As stated above, the internal memory 222 has the first storage area 222*a* and the second storage area 222*b* as the storage areas. In a case where the image is printed, the recording control unit 240*a* records the printed image in the first storage area 222*a* of the internal memory 222, and in a case where the image is captured, the captured image is recorded in the second storage area 222*b* of the internal memory 222.

In a case where the printed image is recorded in the first storage area 222*a*, the recording control unit 240*a* adds information of a printing date and time, and records the image in the first storage area 222*a*. The information of the printing date and time is information indicating a date and time when the image recorded in the first storage area 222*a* is printed, and constitutes information of a printing time point. For example, the information of the printing date and time is recorded in a header of an image file.

The data and time is measured by a timepiece unit (not shown). In a case where the printed image is recorded in the first storage area 222*a*, the recording control unit 240*a* acquires the information of the data and time from the timepiece unit, and acquires the information of the printing date and time.

In a case where the captured image is recorded in the second storage area 222*b*, the recording control unit 240*a* assigns frame numbers to the images, and records the images in the second storage area 222*b*. The frame numbers are assigned in order in which the images are recorded. Accordingly, as the smaller the frame number is, as the older the image is in the date and time when the image is recorded, that is, the time when the image is captured is older.

A storage capacity of the first storage area 222*a* may be set to be smaller than that of the second storage area 222*b*, and may record a predetermined number of images. As an example, one hundred images may be recorded.

In a case where a predetermined number of images (one hundred images) are recorded in the first storage area 222*a*, the recording control unit 240*a* sequentially removes the images of which the printing time point is old, and records a newly printed image.

In a case where the image read out from the first storage area 222*a* is printed, the recording control unit 240*a* updates only the information of the printing date and time of the printed image without recording the image again. That is, in this case, since the printed image is already recorded in the first storage area 222*a*, the recording control unit updates only the information of the printing date and time of the printed image without recording the image again. Accordingly, it is possible to prevent the same image in duplicate from being recorded in the first storage area 222*a*.

Playback Control Unit

The playback control unit 240*b* performs a process of playing the image recorded in the internal memory 222 on the monitor 22. The playback control unit 240*b* plays the image recorded in the internal memory 222 on the monitor 22 in response to the operation of the operation unit 248.

The image is played by setting the mode of the camera to be the playback mode. As stated above, the switching from the capturing mode to the playback mode is performed by the playback button 24*c*6. In a case where the playback button 24*c*6 is pushed in a state in which the digital camera with a printer is set in the capturing mode, the operation mode of the camera is set to the playback mode.

In this case, the digital camera with a printer 1 of the present embodiment has, as the playback mode, a first playback mode and a second playback mode. The first playback mode is a mode in which the image recorded in a first storage area 222*a* of the internal memory 222 is played. The second playback mode is a mode in which the image recorded in a second storage area 222*b* of the internal memory 222 is played. Since the printed image is recorded in the first storage area 222*a*, the first playback mode is selected, and thus, the user can check the images printed so far. Since the captured image is recorded in the second storage area 222*b*, the second playback mode is selected, and thus, the user can check the images captured so far.

In a case where the digital camera with a printer is switched to the playback mode from the capturing mode, the digital camera with a printer 1 of the present embodiment is set in the playback mode in the state of the second playback mode. The switching from the second playback mode to the first playback mode is performed on the menu screen for playing. In a case where the OK button 24*a* is pushed in a state in which the digital camera with a printer is set in the second playback mode, the menu screen for playing is displayed on the monitor 22. In a case where an item of "print history" is selected among a plurality of selection items displayed on the menu screen for playing, the playback mode is switched to the first playback mode. The frame layout is selected by using the operation unit 248. Specifically, the item is selected by rotating or pushing the command dial 24*b*, and the selection is confirmed by pushing the OK button 24*a*.

The switching from the first playback mode to the second playback mode is performed by pushing the playback button 24*c*6.

In a case where the digital camera with a printer is set in the first playback mode, the playback control unit 240*b* reads out the image recorded in the first storage area 222*a* of the internal memory 222, and displays the readout image on the monitor 22. In this case, the playback control unit 240*b* initially reads out the image of which the printing time point is the newest, and displays the readout image on the monitor 22. Thereafter, the images are read out in order in which the printing time point is new, and are played according to the operation of the frame-by-frame playback performed by the operation unit 248. A case where the images are sequentially played in order in which the printing time point is new is a case where the frame-by-frame playback is performed in the forward direction, and in a case where the frame-by-frame playback is performed in the reverse direction, the images are played in the reverse order.

In a case where the digital camera with a printer is set in the second playback mode, the playback control unit 240*b* reads out the image recorded in the second storage area 222*b* of the internal memory 222, and displays the readout image on the monitor 22. In this case, the playback control unit 240b initially reads out the image captured last, and displays the readout image on the monitor 22. That is, the image of which the frame number is the largest is read out, and is played. Thereafter, the images are read out in order of frame numbers and are played according to the operation of the frame-by-frame playback performed by the operation unit 248. A case where the images are played in order of frame numbers is a case where the frame-by-frame playback is performed in the forward direction, and in a case where the frame-by-frame playback is performed in the reverse direction, the images are played in the reverse order thereof.

An operation of the frame-by-frame playback is performed by the command dial 24b. Specifically, in a case where the command dial 24b is rotated in clockwise direction, the frame-by-frame playback is performed in the forward direction, and in a case where the command dial 24b is rotated in the counterclockwise direction, the frame-by-frame playback is performed in the reverse direction. In a case where the command dial 24b is pushed in the rightward direction, the frame-by-frame playback of the image is performed in the forward direction, and in a case where the command dial is pushed in the leftward direction, the frame-by-frame playback of the image is performed in the reverse direction.

Image Processing Unit

The image processing unit 240c performs a process of processing an image being played according to a processing instruction from the operation unit 248.

As stated above, in the digital camera with a printer 1 of the present embodiment, the vignetting process, the effect process, and brightness changing may be performed as the image processing.

(1) Vignetting Process

In a case where the vignetting button 24c1 is pushed for a period during which the image is being played, an instruction to perform the vignetting process on the image being played is transmitted. The image processing unit 240c performs the vignetting process on the image being played according to the instruction to perform the vignetting process. As mentioned above, the vignetting process is a process of reducing the brightness at the edge part of the image.

The intensity of the vignetting process may be adjusted, and the vignetting process is performed with a set intensity. The adjustment of the intensity is performed by using the monitor 22, an intensity capable of being set is displayed on the monitor 22. The user selects a desired intensity by operating the command dial 24b, and confirms the selection by using the OK button 24a.

Figure 10A:
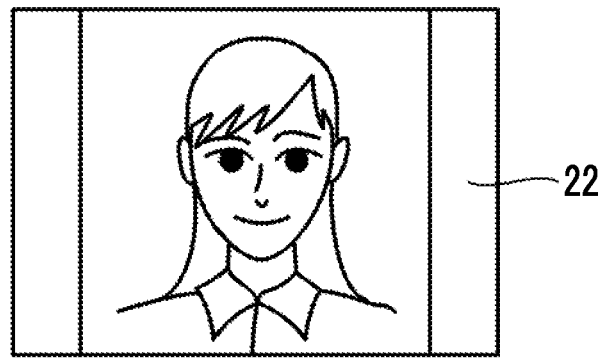
FIGS. 10A to 10C are diagrams showing examples of the vignetting process.
Figure 10B:
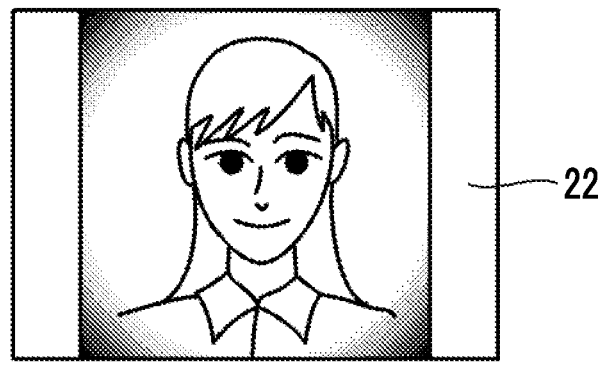
Figure 10C:
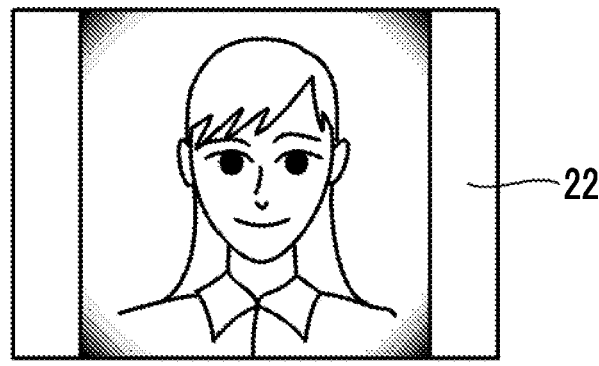

FIGS. 10A to 10C are diagrams showing examples of the vignetting process.

FIG. 10A shows an unprocessed state, and FIG. 10B shows a standard processed state. FIG. 10C shows a processed state with a low intensity.

As shown in FIGS. 10A to 10C, the vignetting process is performed, and thus, the brightness at the edge part of the image is reduced like a case where the amount of light in the edge part of the image is reduced and the capturing is performed. The intensity is adjusted, and thus, a degree with which the brightness of the image is reduced is adjusted.

(2) Effect Process

In a case where the effect button 24c2 is pushed for a period during which the image is being played, an instruction to perform the effect process on the image being played is transmitted. The image processing unit 240c performs the effect process on the image being played according to the instruction of the effect process.

In the digital camera with a printer 1 of the present embodiment, a process of changing the tone of the image is performed as the effect process. In the changing of the tone, monochrome, sepia, or vivid may be selected. In a case where the monochrome is selected, the image processing unit 240c performs a process of changing the tone of the image being played to the monochrome. In a case where the sepia is selected, the image processing unit 240c performs a process of changing the tone of the image being played to the sepia tone. In a case where the vivid is selected, the image processing unit 240c performs a process of changing the saturation of the image being played to a clear tone.

The selection of the tone is performed by using the monitor 22, and a tone capable of being set is displayed on the monitor 22. The user selects a desired tone by operating the command dial 24b, and confirms the selection by using the OK button 24a.

(3) Brightness Changing

In a case where the brightness button 24c3 is pushed for a period during which the image is being played, an instruction to change the brightness of the image being played is transmitted. The image processing unit 240c performs a process of changing the brightness of the image being played according to the instruction to change the brightness.

The brightness may be set toward a plus side or a minus side, and thus, the image is processed with a set change amount. In a case where the brightness is set toward the plus side, the image is processed so as to be bright, and in a case where the brightness is set toward the minus side, the image is processed so as to be dark. The setting is performed by using the monitor 22, and a brightness capable of being set is displayed on the monitor 22. The user selects a desired brightness by operating the command dial 24b, and confirms the selection by using the OK button 24a.

Capturing Control Unit

The capturing control unit 240d performs a capturing process. The capturing process is performed based on a capturing instruction from the operation unit 248. Specifically, the digital camera with a printer performs capturing preparation by operating the half push of the first release button 16A or the second release button 16B, and performs actual capturing by operating the fully push of the first or second button.

In the process of the capturing preparation, the processes such as automatic exposure (AE) and autofocus (AF) are performed. An exposure value is determined through the AE, and focusing on a main subject is performed through the AF.

In the process of the actual capturing, the image sensor 42 is exposed based on the determined exposure value, and an image for recording is received.

The capturing control unit 240d performs a live view process. The live view means that the image caught by the image sensor 42 is displayed on the monitor 22 in real time. The live view is also referred to as through display. The image is displayed as live view on the monitor 22, and thus, the image may be captured by using the monitor 22 instead of the printer.

Print Control Unit

The print control unit 240e performs a printing process. The print control unit 240e controls the configuration related to the printer, and prints the image on the instant film 110 according to the print instruction.

The printing is performed according to the instruction from the user. In a case where the capturing mode is set to the auto mode and the capturing is performed, the capturing is performed simultaneously with the recording of the image.

Work Memory

The work memory 242 is a memory for working. For example, the work memory 242 is a synchronous dynamic random access memory (SDRAM).

Data Memory

The data memory 244 is a memory that stores a program for controlling, and various data items required in the controlling. As stated above, the information of the frame layout, the information of the dialog, and the information of the operation guide are recorded in the data memory 244. The data memory 244 is a non-volatile memory such as EEPROM.

Monitor Driving Unit

The monitor driving unit 246 is driving means of the monitor 22. The monitor driving unit 246 drives the monitor 22 under the control of the system controller 240.

Operation Unit

The operation unit 248 includes the power ring 14, the first release button 16A, the second release button 16B, the rear operation unit 24, and the capturing mode switching lever 26. The operation unit 248 outputs a signal corresponding to an operation of each operation member to the system controller 240.

Power Supply Unit

The power supply unit 250 supplies power to the units under the control of the system controller 240. The power supply unit 250 includes a battery as a power supply and a power supply circuit.

Action

Hereinafter, the action of the digital camera with a printer 1 of the present invention including a printing method of the image will be described.

The digital camera with a printer 1 has, as the operation mode, the capturing mode and the playback mode.

The capturing mode is a mode in which the image is captured. As stated above, the digital camera with a printer 1 of the present embodiment has, as the capturing mode, the auto mode and the manual mode. The auto mode is a mode in which the captured image is automatically printed. The manual mode is a mode in which the captured image is printed according to the print instruction from the user.

The playback mode is a mode in which the image recorded in the internal memory 222 is played. As mentioned above, the digital camera with a printer 1 of the present embodiment has, as the playback mode, the first playback mode and the second playback mode. The first playback mode is a mode in which the image recorded in the first storage area 222a of the internal memory 222 is played. The second playback mode is a mode in which the image recorded in the second storage area 222b of the internal memory 222 is played. It is possible to print the image being played by transmitting the instruction to print the image being played in each mode.

Hereinafter, an operation of the digital camera with a printer 1 will be described in each mode.

Capturing Mode

The digital camera with a printer 1 is activated in the state of the capturing mode in a case where the digital camera with a printer is powered on.

As stated above, the digital camera with a printer 1 of the present embodiment has, as the capturing mode, the auto mode and the manual mode. The switching between the auto mode and the manual mode is performed by the capturing mode switching lever 26. In a case where the capturing mode switching lever 26 is set in the auto position, the digital camera with a printer is set in the auto mode, and in a case where the capturing mode switching lever is set in the manual position, the digital camera with a printer is set in the manual mode.

Auto Mode

The auto mode is a mode in which the captured image is automatically printed.

Figure 11:
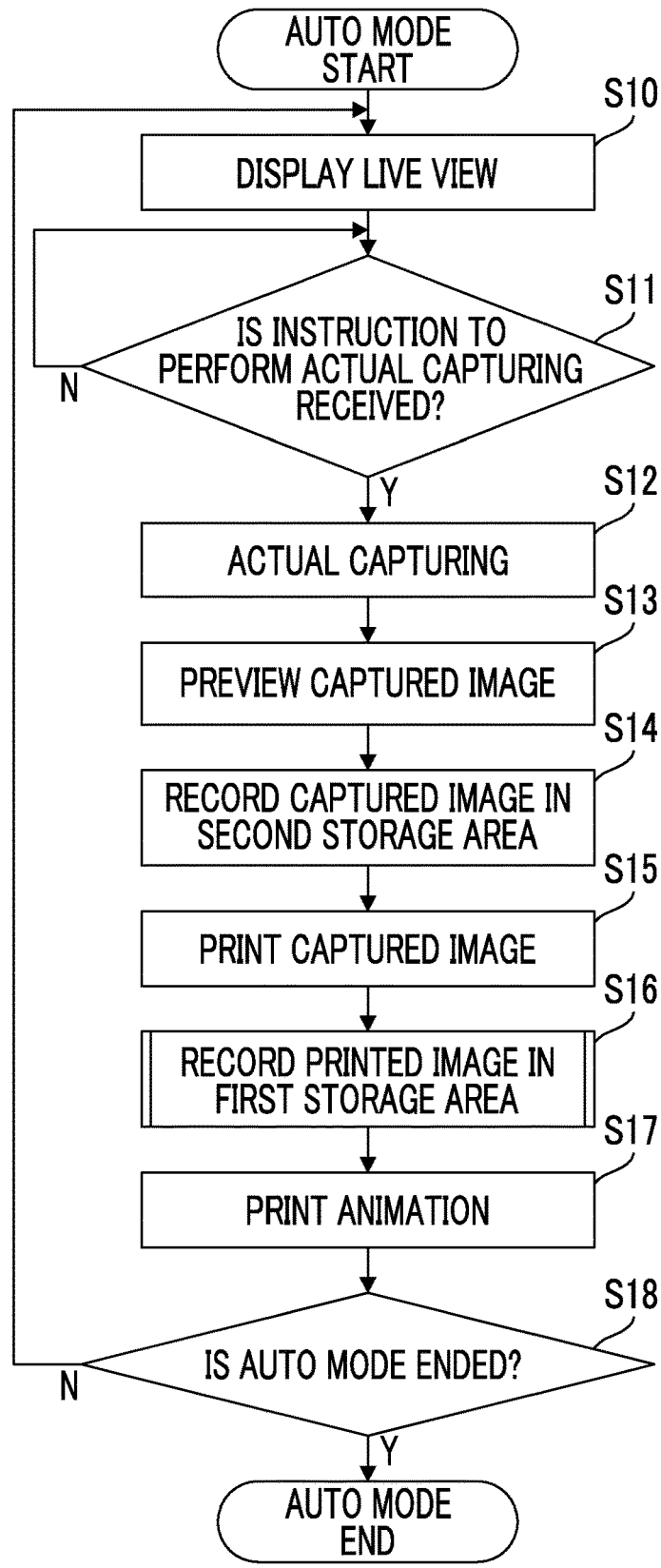
FIG. 11 is a flowchart showing a process procedure in an auto mode.

FIG. 11 is a flowchart showing a process procedure in the auto mode.

Initially, the system controller 240 displays live view on the monitor 22 (step S10).

Figure 12:
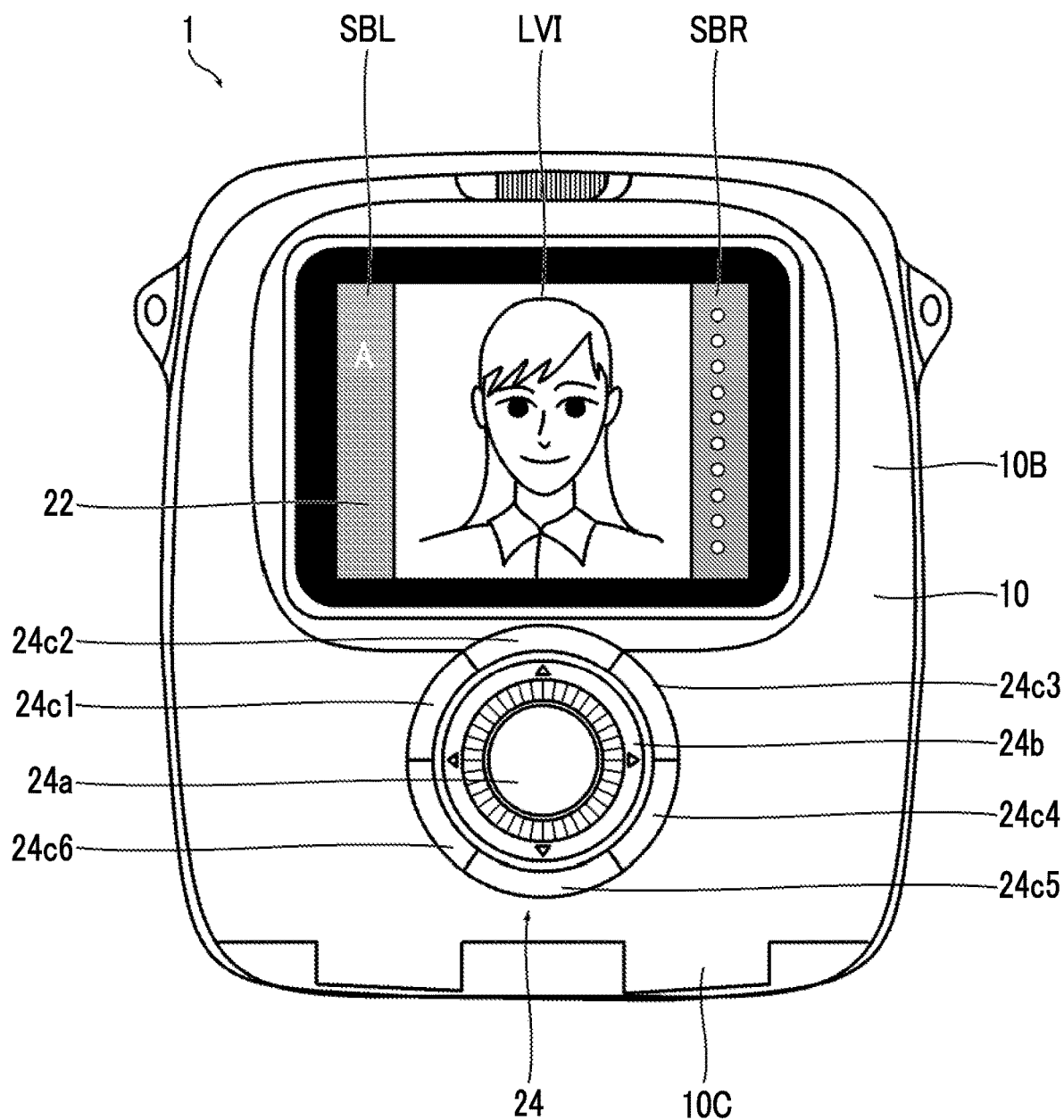
FIG. 12 is a diagram showing an example of the screen display of a monitor on which live view is being displayed.

FIG. 12 is a diagram showing an example of the screen display of the monitor on which the live view is being displayed.

As shown in FIG. 12, a live view image LVI is displayed in the center on the screen of the monitor 22, and side bars SBL and SBR are displayed on both sides thereof.

Information of the capturing mode being set is displayed on the side bar SBL on the left side of the screen. The information of the capturing mode being set is represented by one alphabet character. The information of the capturing mode being set is represented by "A" in a case where the digital camera with a printer is set in the auto mode, and is represented by "M" in a case where the digital camera with a printer is set in the manual mode. FIG. 12 shows the screen display in a case where the digital camera with a printer is set in the auto mode, and thus, a character of "A" representing the auto mode is displayed on the side bar SBL on the left side of the screen.

The number of remaining films is represented on the side bar SBR on the right side of the screen. The number of remaining films is represented by dots. Specifically, the number of dots corresponding to the number of remaining films is represented in the same straight line at certain intervals. FIG. 12 shows an example in which the number of remaining films is 10. The color of the dots is changed in a case where the number of remaining films is equal to or less a certain number. Specifically, the dots are represented in white in a case where the number of remaining films is equal to or greater than three, and are represented in red in a case where the number of remaining films is equal to or less than two. In a case where the number of remaining films is equal to zero, ten gray dots are represented blinking. In a case where the instant film pack 100 is not loaded, and ten gray dots are also represented blinking.

The user determines photographic composition while seeing the image being displayed as the live view on the monitor 22, and checks a focusing state on a subject.

The system controller 240 determines whether or not an instruction to perform the actual capturing is received based on the signal from the operation unit 248 (step S11). The process of the actual capturing is performed according to the instruction to perform the actual capturing (step S12).

The instruction to perform the actual capturing is received by operating the fully push of the first release button 16A or the second release button 16B. As the previous stage, the capturing preparation is performed by operating the half push of the first release button 16A or the second release button 16B.

In a case where the actual capturing is performed, the system controller 240 previews the captured image on the monitor 22 (step S13).

Figure 13:
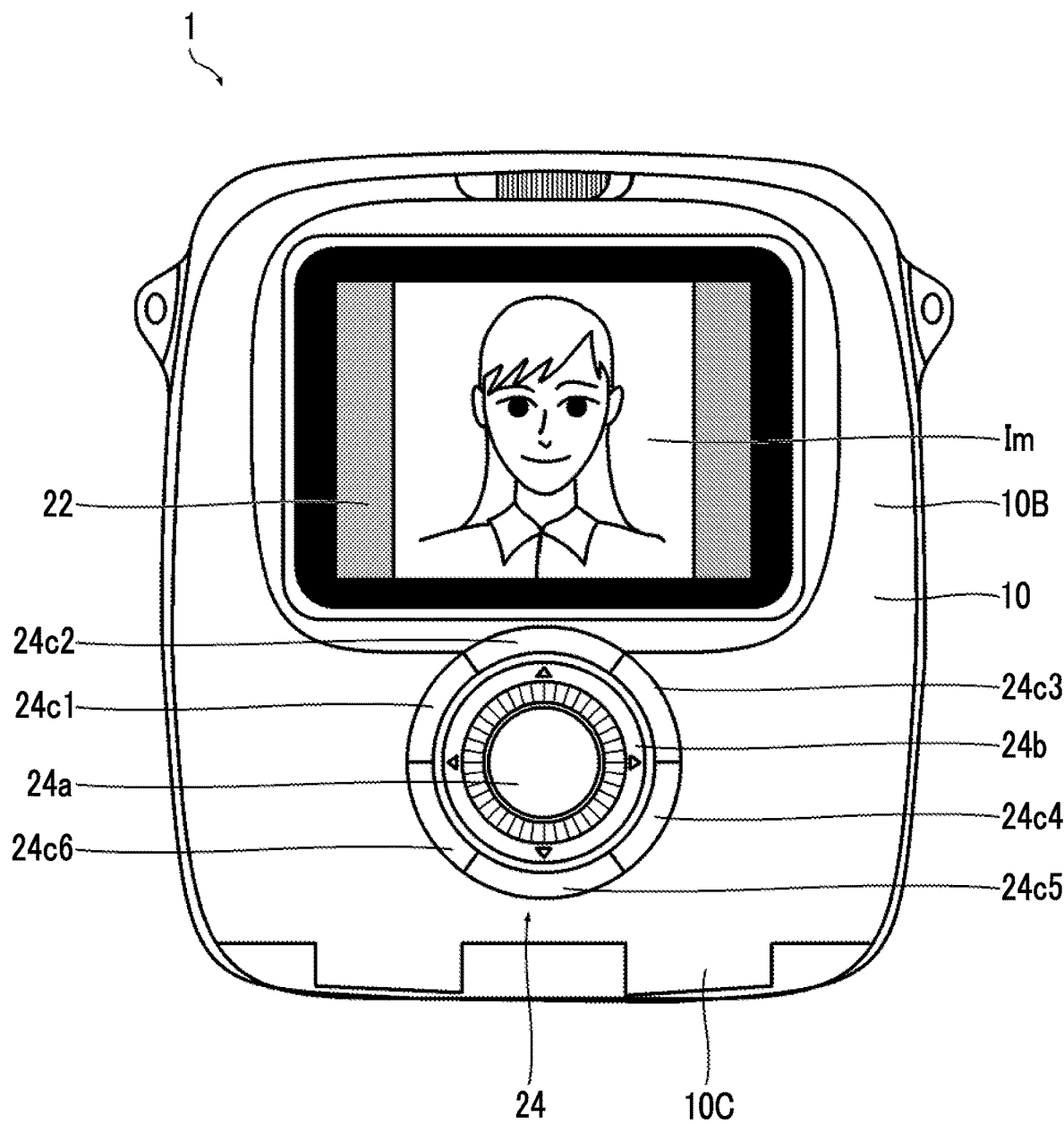
FIG. 13 is a diagram showing an example of the screen display of the monitor being previewed.

FIG. 13 is a diagram showing an example of the screen display of the monitor on which the image is being previewed.

As shown in FIG. 13, the image is previewed, and thus, the captured image is displayed in the center on the screen of the monitor 22.

Thereafter, the system controller 240 records the captured image in the second storage area 222b of the internal memory 222 (step S14). The printing process of the captured image is performed (step S15).

The printing process is performed according to the following procedure. Initially, the image data for printing is generated by the image signal processing unit 236 for printing. Subsequently, one instant film 110 is delivered from the instant film pack 100 by the film delivery mechanism 52. The instant film 110 delivered from the instant film pack 100 is transported by the film transport mechanism 54 at a certain speed. The exposure part 112 is exposed by the print head 56 during the transporting, and the image is recorded on the exposure surface 110a. Thereafter, the exposed instant film 110 is transported between the spreading roller pair 54B, and the development treatment is performed on the instant film. The instant film is ejected from the print ejection port 28.

The instant film 110 is observed in the orientation in which the trap part 116 is at the top and the pod part 114 is at the bottom. Accordingly, the image is printed in an orientation in which the trap part 116 is at the top and the pod part 114 is at the bottom. Since the instant film 110 is ejected from the print ejection port 28 with the pod part 114 as the head, the instant film is ejected in a state in which the instant film is upside down. Accordingly, the image on the instant film is also upside down.

Figure 14:
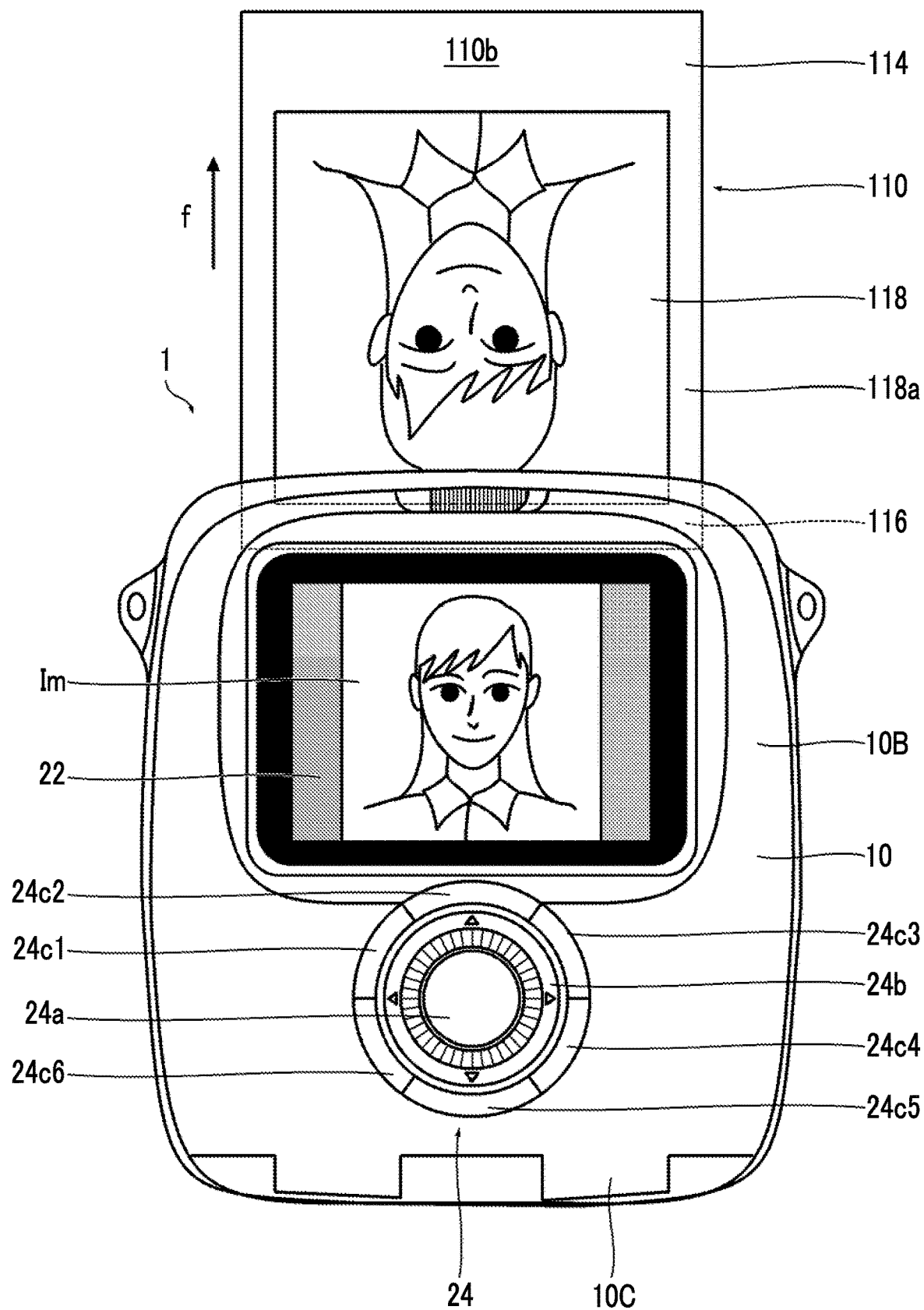
FIG. 14 is a diagram showing an ejection state of the instant film.

FIG. 14 is a diagram showing an ejection state of the instant film. FIG. 14 shows a state after the development treatment is completely ended. In FIG. 14, a direction represented by an arrow f is an ejection direction of the instant film 110.

The instant film 110 is ejected from the top of the camera body 10, and is ejected in substantially parallel with the display surface of the monitor 22.

The ejection direction f of the instant film 110 is a direction parallel to a short side of the monitor 22, and is a direction facing a position directly above the top of the camera body 10. Accordingly, the instant film 110 is ejected upwards when viewed from the monitor 22.

The instant film 110 is ejected while the observation surface 110b thereof faces the rear of the camera body 10. That is, the instant film is ejected such that the image is displayed so as to be seen at the rear of the camera body 10.

The instant film 110 is ejected with the pod part 114 as the head. That is, the instant film is ejected in a state in which the pod part 114 thereof is at the top. In this case, as stated above, the image is printed in a state in which the pod part 114 is at the bottom. Accordingly, the instant film 110 is ejected from the camera body 10 in an orientation opposite to the orientation in which the instant film is actually observed. That is, the instant film is ejected in a state in which the image faces the bottom.

The system controller 240 records the printed image in the first storage area 222a of the internal memory 222 in parallel with the printing process (step S16).

The number of images capable of being recorded in the first storage area 222a is restricted. In a case where a specified number of images are already recorded in the first storage area 222a, the system controller 240 removes the image of which the printing time point is the oldest from the first storage area 222a, and records the newly printed image.

Figure 15:
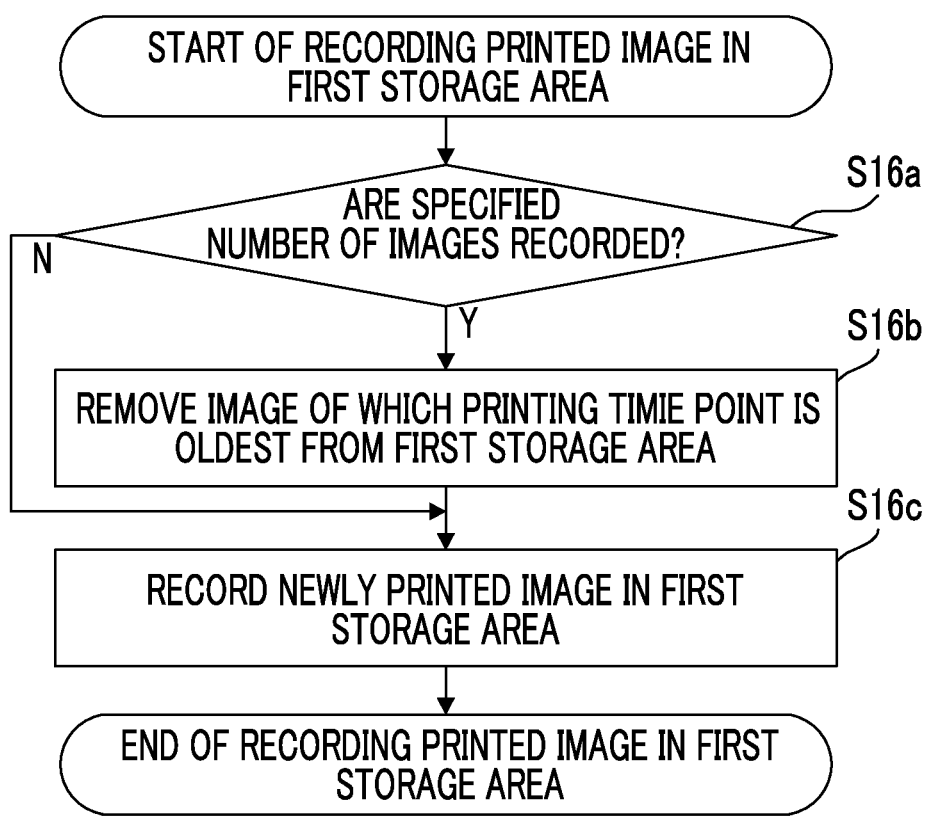
FIG. 15 is a flowchart of a procedure of a process in a case where a printed image is recorded in a first storage area.

FIG. 15 is a flowchart showing a procedure of a process in a case where the printed image is recorded in the first storage area.

Initially, the system controller 240 determines whether or not a specified number of images is recorded in the first storage area 222a of the internal memory 222 (step S16a).

In a case where it is determined that the specified number of images are not recorded in the first storage area 222a of the internal memory 222, the system controller 240 records the newly printed image in the first storage area 222a of the internal memory 222 (step S16c). In this case, the information of the printing date and time is processed, and the image is recorded.

In a case where it is determined that the specified number of images are recorded in the first storage area 222a of the internal memory 222, the system controller 240 extracts the image of which the printing time point is the oldest among the images recorded in the first storage area 222a, and removes the image from the first storage area 222a (step S16b). Thereafter, the system controller 240 records the newly printed image in the first storage area 222a of the internal memory 222 (step S16c). In this case, the information of the printing date and time is processed, and the image is recorded.

As stated above, in a case where a specified number of images are already recorded in the first storage area 222a, the system controller removes the image of which the printing time point is the oldest, and records the newly printed image in the first storage area 222a. Accordingly, only an image having high importance may be automatically selected, and may be stored.

The system controller 240 performs a print animation process in line with the printing process. (step S17).

The process of the print animation is a process of displaying the print imaging image on the monitor 22, moving the imaging image according to the ejection direction of the instant film 110, and removing the imaging image from the screen. The print imaging image is an image of a print to be output. The ejection of the print imaging image is displayed on the screen of the monitor 22 in the form of animation, and thus, it is possible to allow the user to check that the print is ejected.

FIGS. 16A to 16D are diagrams showing the transition of the screen display of the monitor in a case where the print animation process is performed. In FIGS. 16A to 16D, the screen display is changed with time in the order of FIGS. 16A, 16B, 16C, and 16D. FIG. 16A shows the screen display in a case where the printing is started, FIGS. 16B and 16C show the screen display in a case where the printing is being performed (the instant film is being ejected), and FIG. 16D shows the screen display in a case where the printing is ended (the ejection is completed).

As shown in FIG. 16A, the system controller 240 initially displays a print imaging image Im1 on the monitor 22. In the present embodiment, the print imaging image Im1 is an image acquired by adding the image to be printed to a frame F1. The frame F1 is a white frame having a certain width, and is arranged so as to surround the entire circumference of the image. As stated above, the image to be printed on the instant film 110 is displayed within the frame 118a (see FIGS. 6 and 12). Accordingly, since the print imaging image Im1 is the image acquired by adding the image to be printed to the frame F1, it is possible to clarify that the image is to be printed.

As shown in FIG. 16A, the print imaging image Im1 is displayed so as to be overlapped on the image previewed on the monitor 22. Accordingly, the image previewed as the image to be printed on the monitor 22 is hidden by the imaging image Im1, and the previewed image is not able to be visually perceived.

Thereafter, as shown in FIGS. 16B to 16D, the system controller 240 moves the imagining image Im1 in the upward direction which the ejection direction f of the instant film 110, and removes the imaging image from the screen of the monitor 22. The movement of the imaging image Im1 is in line with the ejection of the instant film 110, and the removal of the imaging image is also completed simultaneously with the completion of the ejection of the instant film 110.

The image displayed under the imaging image Im1, that is, a printing target image Im is gradually displayed along with the movement of the imaging image Im1. In the present example, in the print animation, the brightness of the printing target image Im is lowered, and the printing target image is displayed. As stated above, the brightness of the printing target image Im is lowered and the printing target image is displayed. thus, it is possible to clearly distinguish between the printing target image and the imaging image Im1, and it is possible to improve visibility. Although it has been described in the present example that the brightness is changed, the printing target image and the imaging image may be distinguished by changing the saturation, or may be distinguished by changing both the brightness and the saturation. The image may be displayed without changing the brightness thereof.

As stated above, the print imaging image Im1 is removed from the screen by being moved along the ejection direction of the instant film 110. Thus, it is possible to recognize that the image is to be printed at a first glance, and it is possible to recognize the ejection direction of the print. Accordingly, it is possible to improve operability.

In a case where the print imaging image Im1 is completely removed from the screen, the image Im hidden under the imaging image Im1 is completely displayed on the monitor 22, as shown in FIG. 13D. The image Im is an image previewed as the image to be printed on the monitor 22. The image Im is displayed, and thus, the user can check the printed image on the monitor 22.

The image Im for print checking is continuously displayed for a certain time. Thereafter, the system controller 240 determines whether or not the auto mode is ended (step S18). That is, based on the signal from the operation unit 248, the system controller determines whether or not the digital camera with a printer is powered off or whether or not the mode thereof is switched. In a case where it is determined that the auto mode is ended, the process in the auto mode is ended. In a case where it is determined that the auto mode is not ended, the process is returned to step S10. In this case, the display of the monitor 22 is switched to the live view.

As stated above, in a case where the image is captured in the auto mode, the captured image is automatically printed. The captured image is recorded in the second storage area 222b of the internal memory 222, and the printed image is recorded in the first storage area 222a of the internal memory 222. Since the captured image is printed, the same image as that of the second storage area 222b is recorded in the first storage area 222a.

Manual Mode

The manual mode is a mode in which the captured image is printed according to the print instruction from the user. In the manual mode, the image is captured, and then the captured image is previewed on the monitor 22. The user checks the image previewed on the monitor 22, and determines whether or not to print the image. The print instruction is transmitted if necessary. In the manual mode, the previewed image may be processed. The user processes the image if necessary, and inputs the print instruction.

FIG. 17 is a flowchart showing a process procedure in the manual mode.

Initially, the system controller 240 displays the live view on the monitor 22 (step S20). That is, the image caught by the image sensor 42 is displayed on the monitor 22 in real time. Since the digital camera with a printer is set in the manual mode, a character of "M" representing the manual mode is displayed on the side bar SBL on the left side of the screen.

The system controller 240 determines whether or not the instruction to perform the actual capturing is received based on the signal from the operation unit 248 (step S21). The process of the actual capturing is performed according to the instruction to perform the actual capturing (step S22), and the captured image is previewed on the monitor 22 (step s23). The user checks the image previewed on the monitor 22, and determines whether or not to process or print the image.

After the image is previewed, the system controller 240 initially determines whether or not an instruction to process the image is received based on the signal from the operation unit 248 (step S24). That is, the vignetting button 24c1, the effect button 24c2, or the brightness button 24c3 is pushed, and it is determined whether or not the instruction to perform the vignetting process, the effect process, or the brightness changing is received.

In a case where it is determined that the instruction to process the image is transmitted, the system controller 240 processes the image being displayed on the monitor 22 according to the instructed processing content (step S25). In a case where the image is processed, the processed image is displayed on the monitor 22.

Thereafter, the system controller 240 determines whether or not the print instruction is received based on the signal from the operation unit 248 (step S26).

The print instruction is received by pushing the print button 24c4. In a case where the print button 24c4 is pushed, the system controller 240 displays the dialog for inquiring about the printing on the monitor 22.

Figure 18:
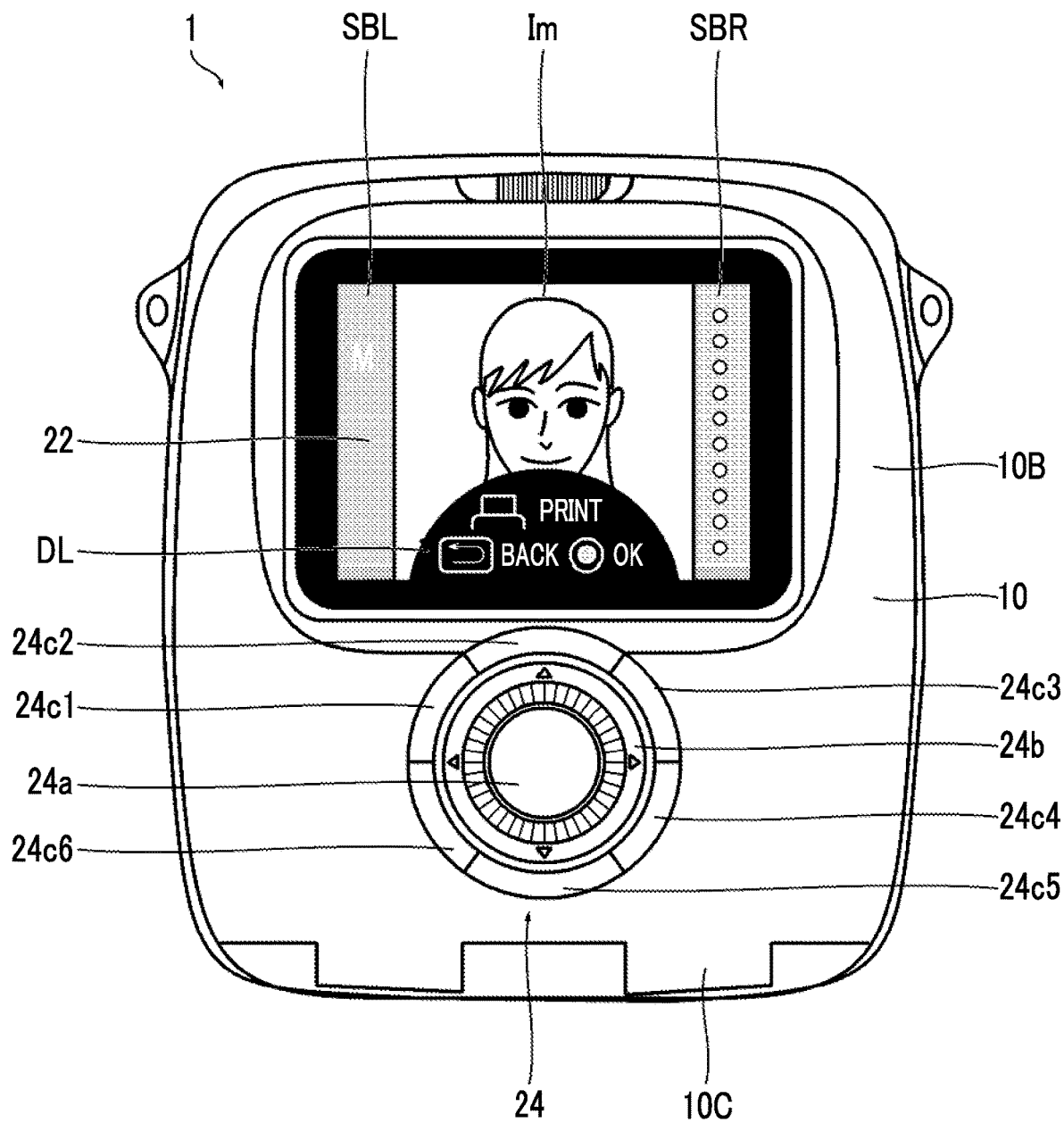
FIG. 18 is a diagram showing an example of the screen display of the monitor on which a dialog is displayed.

FIG. 18 is a diagram showing an example of the screen display of the monitor on which the dialog is displayed.

As shown in FIG. 18, a dialog DL is represented by a geometric semicircular shape, and is displayed so as to protrude from a lower edge of the screen. A geometric shape representing the printing and characters of "PRINT", a geometric shape representing the back button and characters of "BACK", and a geometric shape representing the OK button and characters of "OK" are displayed in the dialog DL. The dialog DL is displayed so as to be overlapped on the image being displayed which is a printing target image. The dialog DL is displayed, and thus, it is possible to recognize that the print instruction is to be confirmed in a case where the user pushes the OK button 24a and the print instruction is canceled in a case where the user pushes the back button 24c5. In the digital camera with a printer 1 of the present embodiment, since the rear operation unit 24 has the circular shape, the dialog DL is the geometric semicircular shape which is a part of the circle, and thus, it is possible to clarify the relationship between the display of the dialog DL and the rear operation unit 24. The dialog DL is displayed so as to protrude directly upwards from the lower edge which is an edge closest to the rear operation unit 24, and thus, it is possible to further clarify the relationship between the display of the dialog DL and the rear operation unit 24.

In a case where the image being displayed on the monitor 22 is desired to be printed, the user pushes the print button 24c4, and subsequently pushes the OK button 24a according to the display of the dialog DL. Accordingly, the print instruction is confirmed.

After the print instruction is received, in a case where the user rethinks and cancels the print instruction, the user pushes the back button 24c5. Accordingly, the print instruction is canceled. In a case where the print instruction is canceled, the display of the monitor 22 is returned to the state before the instruction is received. That is, the display of the dialog DL is removed.

In a case where the print instruction is confirmed, the system controller 240 performs the printing process (step S27). The printed image is recorded in the first storage area 222a of the internal memory 222 in parallel with the printing process (step S28). In this case, in a case where a specified number of images are already recorded in the first storage area 222a, the image of which the printing time point is the oldest is removed from the first storage area 222a, and the newly printed image is recorded in the first storage area 222a (see FIG. 15).

The system controller 240 performs a print animation process in line with the printing process. (step S29). That is, the print imaging image is displayed so as to be overlapped on the image being displayed on the monitor 22. Thereafter, the imaging image is moved along the ejection direction f of the instant film 110, and is removed from the screen (see FIGS. 16A to 16D). Accordingly, it is possible to recognize that the image Im is to be printed while seeing the display of the monitor 22 at a first glance, and it is possible to recognize the ejection direction of the print.

Thereafter, the system controller 240 records the captured image in the second storage area 222b of the internal memory 222 (step S30). In this case, in a case where the image is processed, the processed image is recorded as the captured image. In a case where the captured image is printed, the same image as the image recorded in the first storage area 222a is recorded.

Thereafter, the system controller 240 determines whether or not the manual mode is ended (step S31). That is, based on the signal from the operation unit 248, the system controller determines whether or not the digital camera with a printer is powered off or whether or not the mode thereof is switched. In a case where it is determined that the manual mode is ended, the process in the manual mode is ended. In a case where the manual mode is not ended, the process is returned to step S20. In this case, the display of the monitor 22 is switched to the live view.

As stated above, in the manual mode, the captured image is printed only in a case where the print instruction is input by the user. Accordingly, it is possible to print only an image desired to be printed in the manual mode.

In a case where the image is captured in the manual mode, the captured image is also recorded in the second storage area 222b of the internal memory 222. In a case where the image is printed, the printed image is recorded in the first storage area 222a of the internal memory 222.

Playback Mode

As mentioned above, the digital camera with a printer 1 of the present embodiment has, as the playback mode, the first playback mode and the second playback mode.

The first playback mode is a mode in which the image recorded in the first storage area 222a of the internal memory 222 is played.

The second playback mode is a mode in which the image recorded in the second storage area 222b of the internal memory 222 is played.

It is possible to print the image being played by transmitting the instruction to print the image being played in each mode.

The switching from the capturing mode to the playback mode is performed by the playback button 24c6. In a case where the playback button 24c6 is pushed in a state in which the digital camera with a printer is set in the capturing mode, the operation mode of the digital camera with a printer 1 is switched to the playback mode. In this case, the operation mode is switched in a state in which the digital camera with a printer is set in the second playback mode. That is, in a case where the second playback mode is set as a standard playback mode and the operation mode is switched from the capturing mode to the playback mode, the operation mode is set to the playback mode in the state of the second playback mode. As stated above, the switching from the second playback mode to the first playback mode is performed on the menu screen for playing. That is, the item of "print history" is selected on the menu screen for playing, and thus, the playback mode is switched to the first playback mode.

Hereinafter, an operation in the second playback mode which is the standard playback mode will be described, and then an operation in the first playback mode will be described.

Second Playback Mode

The second playback mode is a mode in which the image recorded in the second storage area 222b of the internal memory 222 is played.

Figure 19:
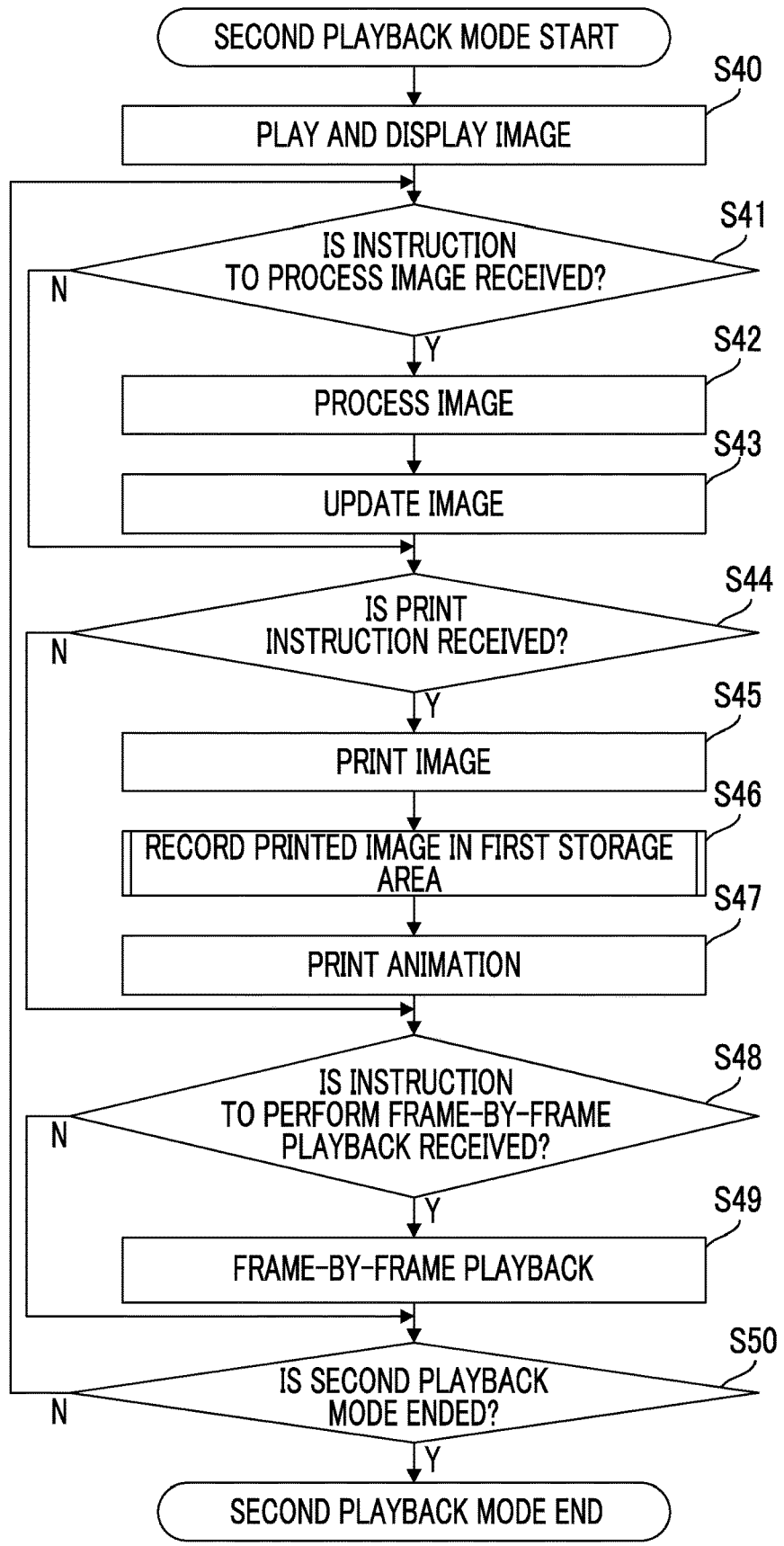
FIG. 19 is a flowchart showing a process procedure in a second playback mode.

FIG. 19 is a flowchart showing a process procedure in the second playback mode.

In a case where the digital camera with a printer is set in the playback mode, the system controller 240 reads out one image recorded in the second storage area 222b of the internal memory 222, and displays the readout image on the monitor 22 (step S40). The image initially read out is an image recorded last in the internal memory 222, that is, an image captured last.

Figure 20:
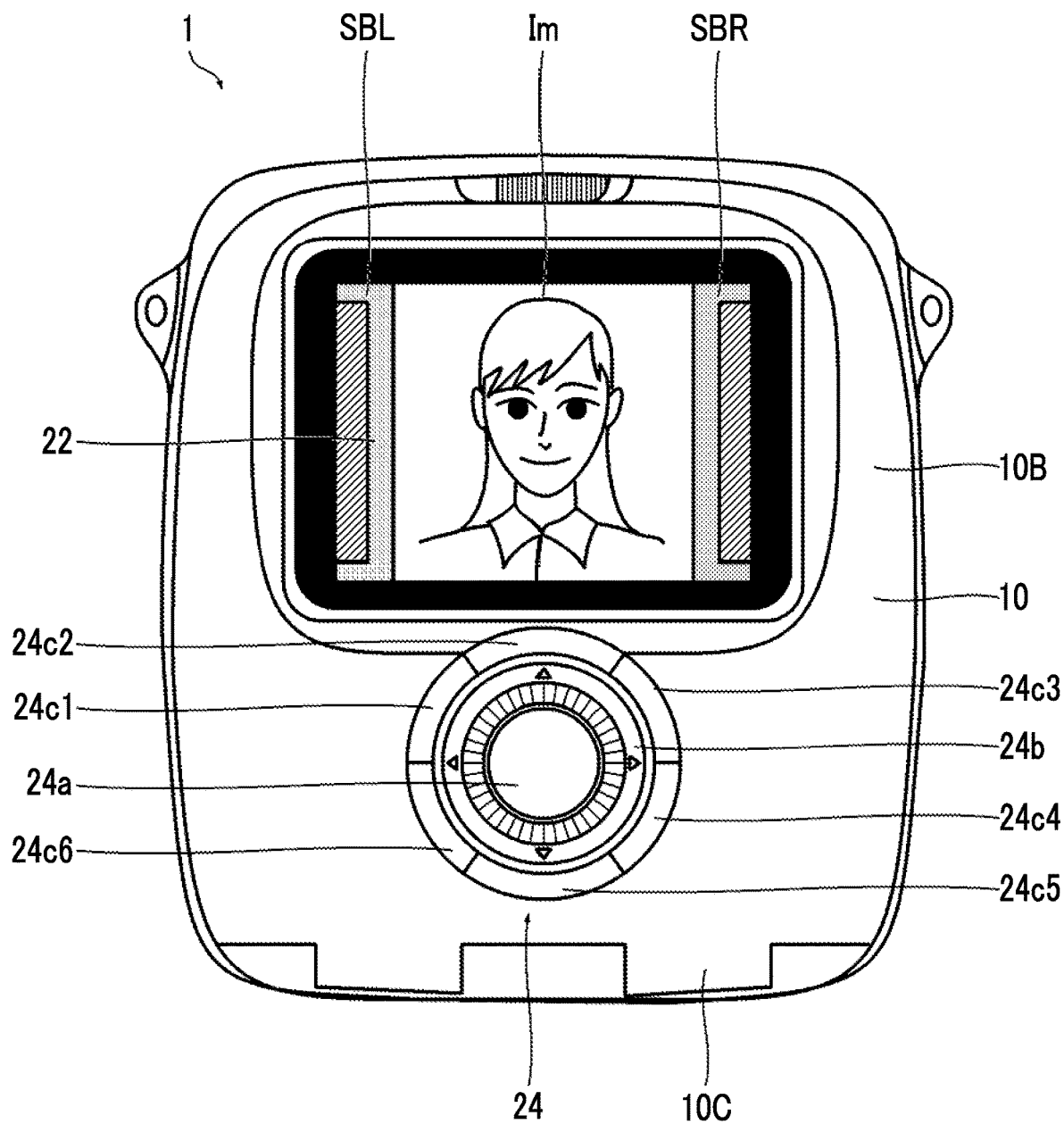
FIG. 20 is a diagram showing an example of the screen display of the monitor in a case where the digital camera with a printer is set in a playback mode.

FIG. 20 is a diagram showing an example of the screen display of the monitor in a case where the digital camera with a printer is set in the playback mode.

As shown in FIG. 20, the readout image Im is displayed in the center on the screen of the monitor 22, and the side bars SBL and SBR are displayed on both sides. In a case where the frame-by-frame playback is performed in a forward direction, the brightness of a part (right end portion) of an image to be played next is lowered, and is displayed on the side bar SBL on the left side of the screen. In a case where frame-by-frame playback is performed in a reverse direction, the brightness of a part (left end portion) of an image to be played next is lowered, and is displayed on the side bar SBR on the right side of the screen.

In a case where the images are played, the system controller 240 determines whether or not an instruction to process the image is received based on the signal from the operation unit 248 (step S41). That is, the vignetting button 24c1, the effect button 24c2, or the brightness button 24c3 is pushed, and it is determined whether or not the instruction to perform the vignetting process, the effect process, or the brightness changing is transmitted.

In a case where it is determined that the instruction to process the image is received, the system controller 240 processes the image being displayed on the monitor 22 according to the instructed processing content (step S42).

In a case where the image is processed, the image recorded in the second storage area 222b is updated to the processed image (step S43).

Thereafter, the system controller 240 determines whether or not the print instruction is received based on the signal from the operation unit 248 (step S44).

The print instruction is received by pushing the print button 24c4. In a case where the print button 24c4 is pushed, the system controller 240 displays the dialog for inquiring about the printing on the monitor 22.

Figure 21:
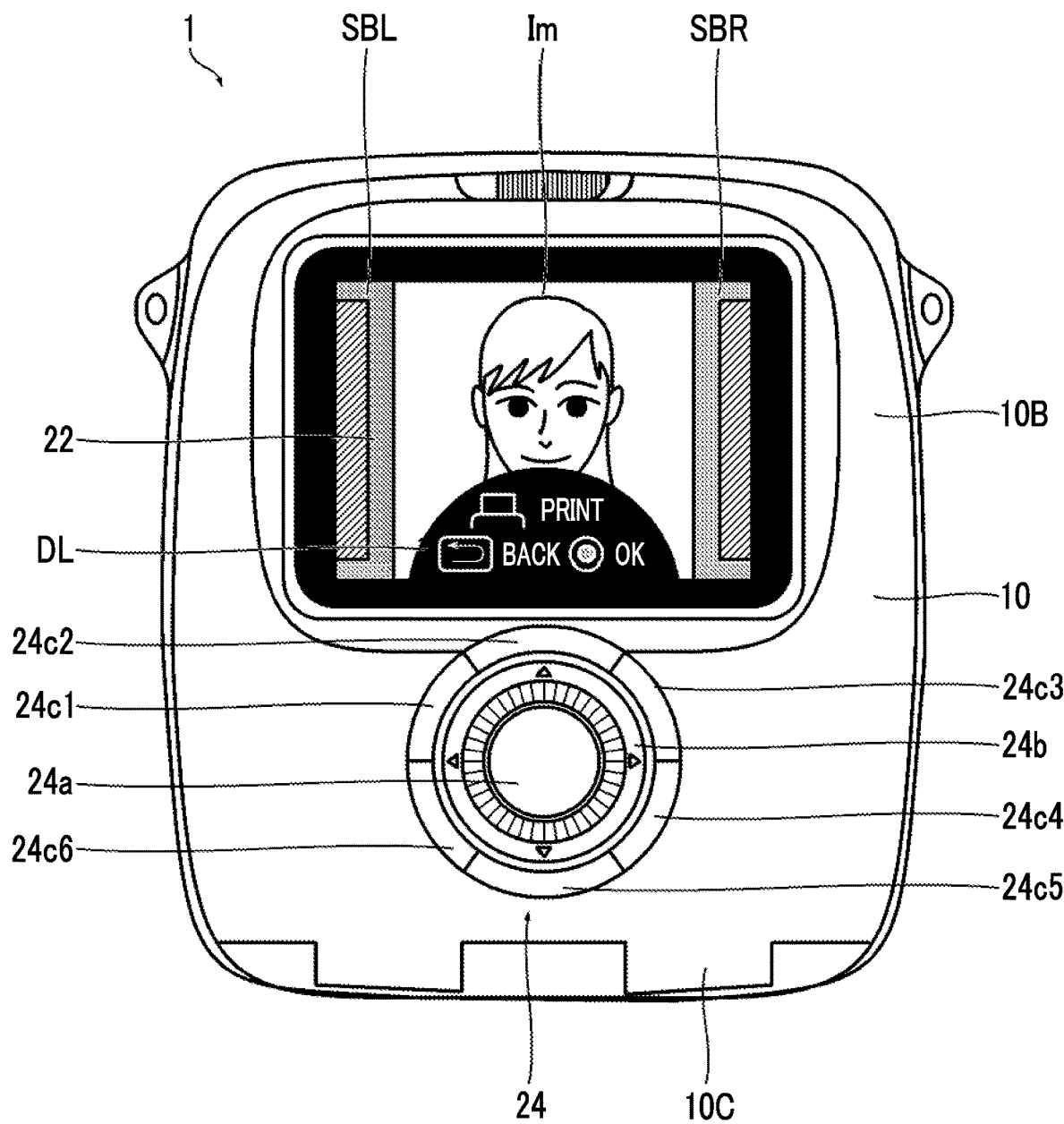
FIG. 21 is a diagram showing an example of the screen display of the monitor on which the dialog is being displayed.

FIG. 21 is a diagram showing an example of the screen display of the monitor on which the dialog is being displayed.

As shown in FIG. 21, a dialog DL is represented by a geometric semicircular shape, and is displayed so as to protrude from a lower edge of the screen. A geometric shape representing the printing and characters of "PRINT", a geometric shape representing the back button and characters of "BACK", and a geometric shape representing the OK button and characters of "OK" are displayed in the dialog DL. The dialog DL is displayed so as to be overlapped on the image being displayed which is a printing target image.

The dialog DL is displayed, and thus, it is possible to recognize that the print instruction is to be confirmed in a case where the user pushes the OK button 24a and the print instruction is canceled in a case where the user pushes the back button 24c5.

The user pushes the OK button 24a in a case where the print instruction is confirmed. Accordingly, the print instruction is confirmed.

In a case where the print instruction is confirmed, the system controller 240 performs the printing process on the image being played (step S45). The printed image is recorded in the first storage area 222a of the internal memory 222 in parallel with the printing process (step S46). In this case, in a case where a specified number of images are already recorded in the first storage area 222a, the image of which the printing time point is the oldest is removed from the first storage area 222a, and the newly printed image is recorded in the first storage area 222a (see FIG. 15).

The system controller 240 performs a print animation process in line with the printing process. (step S47). That is, the print imaging image is displayed so as to be overlapped on the image Im being displayed. Thereafter, the imaging image is moved along the ejection direction f of the instant film 110, and is removed from the screen (see FIGS. 16A to 16D). Accordingly, it is possible to recognize that the image Im is to be printed while seeing the display of the monitor 22 at a first glance, and it is possible to recognize the ejection direction of the print.

Thereafter, the system controller 240 determines whether or not an instruction to perform the frame-by-frame playback is received based on the signal from the operation unit 248 (step S48).

An operation of the frame-by-frame playback is performed by the command dial 24b. In a case where the command dial 24b is pushed in the rightward direction, or in a case where the command dial 24b is rotated in the clockwise direction, an instruction to perform the frame-by-frame playback in the forward direction is transmitted. In a case where the command dial 24b is pushed in the leftward direction, or in a case where the command dial 24b is rotated in the counterclockwise direction, an instruction to perform the frame-by-frame playback in the reverse direction is transmitted.

The frame-by-frame playback of the images is performed one by one. That is, whenever the command dial 24b is pushed in the rightward direction once, or whenever the command dial 24b is rotated in the clockwise direction with a certain amount, the frame-by-frame playback of the images one by one in the forward direction is performed. Whenever the command dial 24b is pushed in the leftward once, or whenever the command dial 24b is rotated in the counterclockwise direction with a certain amount, the frame-by-frame playback of the images one by one in the reverse direction is performed.

The frame-by-frame playback in the forward direction is performed, and thus, the frame-by-frame playback of the images in order of frame numbers is performed. The frame-by-frame playback in the reverse direction is performed, and thus, the frame-by-frame playback of the images in the reverse order thereof is performed.

In a case where the instruction to perform the frame-by-frame playback is received, the system controller 240 performs the frame-by-frame playback in the instruction direction (step S49). That is, in a case where the instruction to perform the frame-by-frame playback in the forward direction is received, the frame-by-frame playback is performed in the forward direction, and in a case where the instruction to perform the frame-by-frame playback in the reverse direction is received, the frame-by-frame playback is performed in the reverse direction.

Thereafter, the system controller 240 determines whether or not the second playback mode is ended (step S50). That is, based on the signal from the operation unit 248, the system controller determines whether or not the digital camera with a printer is powered off or whether or not the mode thereof is switched. In a case where it is determined that the second playback mode is ended, the process in the second playback mode is ended.

As mentioned above, the digital camera with a printer is set in the second playback mode, and thus, it is possible to play the image recorded in the second storage area 222b of the internal memory 222 on the monitor 22. It is possible to process and print the image being displayed on the monitor 22. In a case where the image is printed, the printed image is recorded in the first storage area 222a of the internal memory 222.

First Playback Mode

The first playback mode is a mode in which the image recorded in the first storage area 222a of the internal memory 222 is played.

The item of "print history" is selected on the menu screen for playing, and thus, the playback mode is switched to the first playback mode. That is, the first playback mode is positioned as a mode in which print history is checked.

Figure 22:
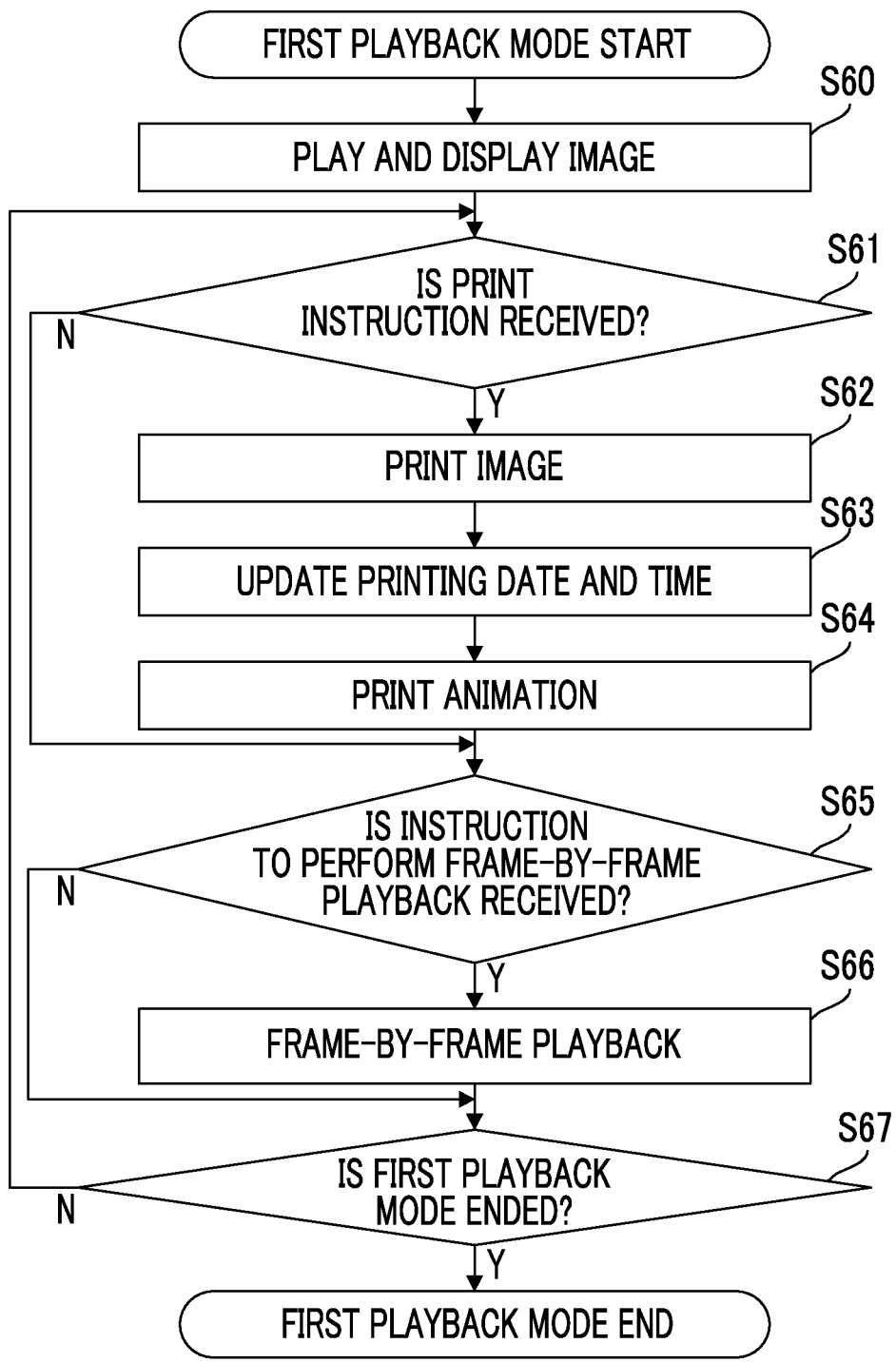
FIG. 22 is a flowchart showing a process procedure in a first playback mode.

FIG. 22 is a flowchart showing a process procedure in the first playback mode.

In a case where the digital camera with a printer is set in the playback mode, the system controller 240 reads out one image recorded in the first storage area 222a of the internal memory 222, and displays the readout image on the monitor 22 (step S60). An image to be initially read out is an image of which a printing time point is the newest, that is, an image printed last.

The display form of the image is the same as that in the second playback mode (see FIG. 20). That is, the readout image Im is displayed in the center on the screen of the monitor 22, and the side bards SBL and SBR are displayed on both sides. In a case where the frame-by-frame playback is performed in a forward direction, the brightness of a part (right end portion) of an image to be played next is lowered, and is displayed on the side bar SBL on the left side of the screen. In a case where frame-by-frame playback is performed in a reverse direction, the brightness of a part (left end portion) of an image to be played next is lowered, and is displayed on the side bar SBR on the right side of the screen.

In a case where the images are played, the system controller 240 determines whether or not the print instruction is received based on the signal from the operation unit 248 (step S61).

The print instruction is received by pushing the print button 24c4. In a case where the print button 24c4 is pushed, the system controller 240 displays the dialog for inquiring about the printing on the monitor 22 (see FIG. 21).

In a case where the print instruction is received, the system controller 240 performs the printing process on the image being played (step S62). The information of the printing date and time of the printed image is updated in parallel with the printing process (step S63). That is, since the printed image is already recorded in the first storage area 222a, only the information of the printing date and time which is information representing the printing time point is updated. Accordingly, it is possible to prevent the same image in duplicate from being recorded.

The system controller 240 performs a print animation process in line with the printing process. (step S64). That is, the print imaging image is displayed so as to be overlapped on the image Im being displayed. Thereafter, the imaging image is moved along the ejection direction f of the instant film 110, and is removed from the screen (see FIGS. 16A to 16D). Accordingly, it is possible to recognize that the image Im is to be printed while seeing the display of the monitor 22 at a first glance, and it is possible to recognize the ejection direction of the print.

Thereafter, the system controller 240 determines whether or not an instruction to perform the frame-by-frame playback is received based on the signal from the operation unit 248 (step S65).

An operation of the frame-by-frame playback is performed by the command dial 24b. In a case where the command dial 24b is pushed in the rightward direction, or in a case where the command dial 24b is rotated in the clockwise direction, an instruction to perform the frame-by-frame playback in the forward direction is transmitted. In a case where the command dial 24b is pushed in the leftward direction, or in a case where the command dial 24b is rotated in the counterclockwise direction, an instruction to perform the frame-by-frame playback in the reverse direction is transmitted.

The frame-by-frame playback of the images is performed one by one. That is, whenever the command dial 24b is pushed in the rightward direction once, or whenever the command dial 24b is rotated in the clockwise direction with a certain amount, the frame-by-frame playback of the images one by one in the forward direction is performed. Whenever the command dial 24b is pushed in the leftward once, or whenever the command dial 24b is rotated in the counterclockwise direction with a certain amount, the frame-by-frame playback of the images one by one in the reverse direction is performed.

The frame-by-frame playback in the forward direction is performed, and thus, the frame-by-frame playback of the images is performed in order in which a printing time point is new. The frame-by-frame playback in the reverse direction is performed, and thus, the frame-by-frame playback of the images is performed in the reverse order thereof.

In a case where it is determined that the instruction to perform the frame-by-frame playback is received, the system controller 240 performs the frame-by-frame playback of the images based on the operation of the operation unit 248 (step S66).

Thereafter, the system controller 240 determines whether or not the first playback mode is ended (step S67). That is, based on the signal from the operation unit 248, the system controller determines whether or not the digital camera with a printer is powered off or whether or not the mode thereof is switched. In a case where it is determined that the first playback mode is ended, the process in the first playback mode is ended.

As mentioned above, the digital camera with a printer is set in the first playback mode, and thus, it is possible to play the image recorded in the first storage area 222a of the internal memory 222 on the monitor 22. It is possible to print the image being displayed on the monitor 22.

In the first playback mode, since only the printed image is played, it is possible to search for a target image simply and efficiently in a case where the image is reprinted.

Since the images are played in order in which the printing time point is new, it is possible to preferentially play the images to be repeatedly reprinted. Accordingly, it is possible to more efficiently search for a target image.

The number of images capable of being recorded in the first storage area 222a is restricted, and thus, it is possible to efficiently search for a target image.

Modification Example

Method of Managing Printing Time Point

Although it has been described in the above-described embodiment that the printing time point of each image recorded in the first storage area 222a is managed by giving the information (the information of the printing date and time) of the printing time point to the image and recording such an image, the method of managing the printing time point of each image is not limited thereto. In addition, a file for managing the information of the printing time point of each image may be separately generated, and the printing time point of each image may be managed by using this file.

Copying of Image

The digital camera with a printer 1 has the function of recording the image in the internal memory 222, and may also have a function of copying the image. In this case, it is more preferable that only the copying of the image from the first storage area 222a to the second storage area 222b is permitted and the copying of the image from the second storage area 222b to the first storage area 222a is prohibited.

The copying of the image from the first storage area 222a to the second storage area 222b is permitted, and thus, a favorite image may retreat to the second storage area 222b.

The copying of the image to the first storage area 222a is prohibited, and thus, it is possible to previously prevent the management of the printing time point from not being able to be managed.

For example, the copying of the image is performed in the first playback mode, and the image is copied to the second storage area 222b by transmitting an instruction to copy the image being played.

Image Size

In a case where the printed image is recorded in the first storage area 222a, the image may be adjusted so as to have a certain size, and may be recorded. That is, the image may be adjusted so as to have a size required in the print, and may be recorded. Since the image to be reprinted in the digital camera with a printer 1 is recorded in the first storage area 222A, it is not necessary to record a large image. Accordingly, the image having the size required in the print is recorded, and thus, it is possible to prevent the storage capacity from being wastefully consumed. The size required in the print is determined by the size of the instant film 110 to be used by the digital camera with a printer 1 or resolution capable of being realized by the print head 56.

In the present example, the recording control unit adjusts the size of the image so as to have a certain size, and records the image in a case where the image is recorded in the first storage area 222*a*.

Processing of Image

Although it has been described in the aforementioned embodiment that the vignetting process, the effect process, and the brightness changing are used as the image processing capable of being performed, an example of the image processing capable of being performed is not limited thereto. In addition, a known image processing such as image rotation, sharpness, or soft processing may be performed.

Playback of Image

Although it has been described in the aforementioned embodiment that the images are played one by one, a plurality of images may be played at once. For example, the screen may be split into four frames, and four images may be played at once (so-called multi-playback).

Printing of Image

Although it has been described in the aforementioned embodiment that the images are printed one by one, a plurality of images may be printed on one instant film 110 at once (so-called multi-print). In this case, the multi-printed images are recorded as the printed image in the first storage area 222*a*.

First Storage Unit and Second Storage Unit

Although it has been described in the aforementioned embodiment that one internal memory 222 functions as the first storage unit and the second storage unit by distinguishing between the storage areas of one internal memory 222, the first storage unit and the second storage unit may be physically separated memory units. For example, the first storage unit may be a first internal memory, and the second storage unit may be a second internal memory. Alternatively, the first storage unit may be the internal memory, and the second storage unit may be a detachable and attachable external memory.

Figure 23:
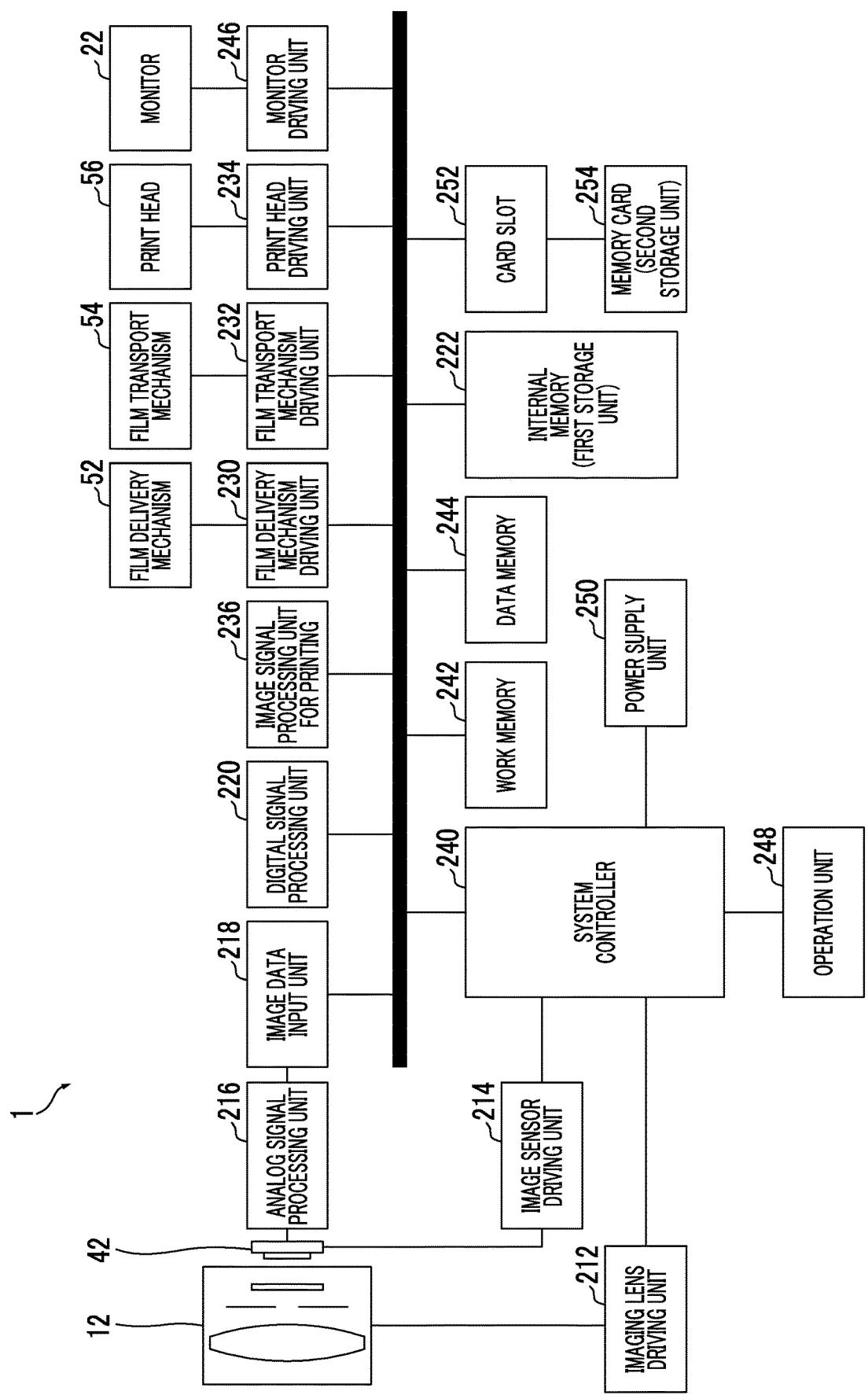
FIG. 23 is a diagram showing an electric configuration of the digital camera with a printer in a case where a first storage unit is an internal memory and a second storage unit is a detachable and attachable external memory.

FIG. 23 is a diagram showing an electric configuration of the digital camera with a printer in a case where the first storage unit is the internal memory and the second storage unit is the detachable and attachable external memory.

As shown in FIG. 23, the digital camera with a printer 1 includes a card slot 252, and a memory card 254 is detachably attached as an external memory to the card slot 252. In this case, the memory card 254 functions as the second storage unit, and the internal memory 222 functions as the first storage unit.

The system controller 240 as the recording control unit records the captured image in the memory card 254, and records the printed image in the internal memory 222.

The captured image is recorded in the detachable and attachable memory card 254, and thus, it is possible to capture the image at ease. It is possible to improve usability.

Even in a case where the detachable and attachable external memory is provided as in the present example, the internal memory 222 may have the function of the second storage unit. In this case, it is preferable that the user is able to select an image recording destination.

In a case where there is no storage capacity in one memory, the image may be automatically recorded in the other memory.

Recording Restriction in First Storage Unit

Although it has been described in the aforementioned embodiment that a predetermined number of images are able to be recorded in the first storage area 222*a* which is the first storage unit, the number of images capable of being recorded in the first storage unit may be restricted to the capacity of the first storage unit. In this case, the image recorded in the first storage unit is removed based on the remaining capacity of the first storage unit. That is, in a case where the newly printed image is recorded, it may be determined whether or not whether or not the remaining capacity is insufficient, and the image of which the printing time point is old may be removed, and the image may be recorded.

Reception of Image

Although it has been described in the aforementioned embodiment that the printing target image is received by capturing the image, the digital camera with a printer may communicate with an external device, and the printing target image may be received from the external device.

Figure 24:
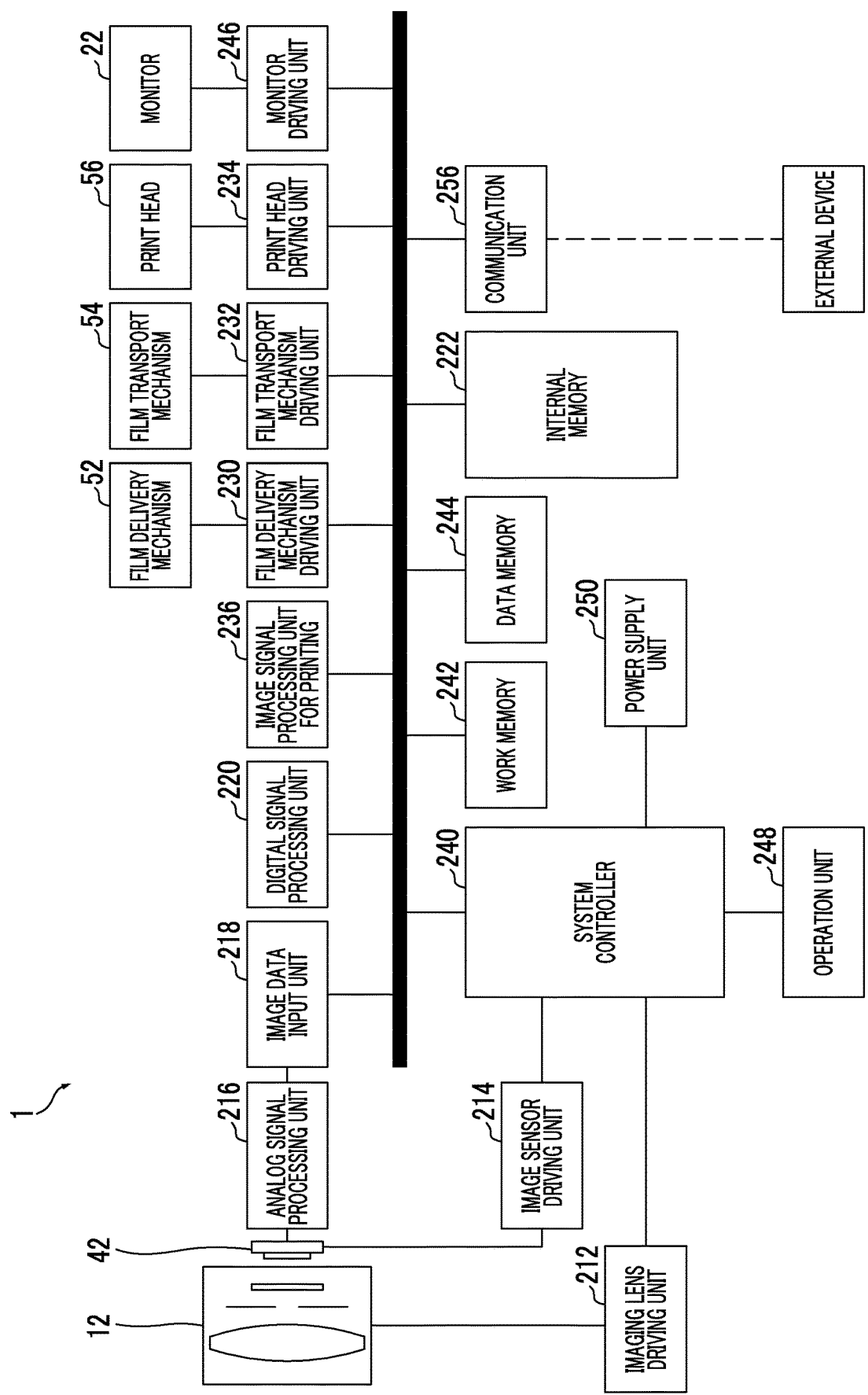
FIG. 24 is a diagram showing an electric configuration of the digital camera with a printer having a communication function.

FIG. 24 is a diagram showing an electric configuration of the digital camera with a printer having a communication function.

As shown in FIG. 24, the digital camera with a printer 1 includes a communication unit 256, and may communicate with the external device. The form of the communication using the communication unit 256 is not particularly limited, and a known communication method may be adopted. For example, wireless communication through near-field wireless or wired communication using a universal serial bus (USB) cable is adopted.

For example, the communication unit 256 is provided, and thus, it is possible to receive the image from the external device such as a smartphone or a tablet and to print the image.

Selection of Playback Mode

Although it has been described in the aforementioned embodiment that the playback mode is switched through the operation on the screen, the configuration of the playback mode selection unit is not limited thereto. In addition, similarly to the selection of the capturing mode, a playback mode switching lever may be provided at the camera body 10, and the first playback mode or the second playback mode may be selected by the operation of the playback mode switching mode.

Similarly, the capturing mode may be switched through the operation on the screen.

Application to Printer

Although it has been described in the aforementioned embodiment that the present invention is applied to the digital camera with a printer, the application of the present invention is not limited thereto. The present invention may be applied to a printer.

Printing Method

Although it has been described in the aforementioned embodiment that the instant film is used as a medium and the image is printed using the exposure head, the medium to be used and the printing method are not limited thereto. In addition, for example, thermal paper may be used as the medium, and the image may be printed using a thermal head. The image may be printed on the medium by using an ink ribbon and a thermal head, or the image may be printed by using an inkjet head.

Other Modification Examples

The amount of remaining battery may be monitored, and in a case where the amount of remaining battery is equal to or less than a certain amount, the reception of the print may be stopped. Accordingly, it is possible to prevent the battery from being flat during the printing.

EXPLANATION OF REFERENCES

1: digital camera with printer
10: camera body
10A: main body
10B: back cover
10C: hinge
12: imaging lens
12a: stop
12b: shutter
14: power ring
16A: first release button
16B: second release button
18: flash
20: auxiliary light lamp
22: monitor
24: rear operation unit
24a: OK button
24b: command dial
24c1: first function button (vignetting button)
24c2: second function button (effect button)
24c3: third function button (brightness button)
24c4: fourth function button (print button)
24c5: fifth function button (back button)
24c6: sixth function button (playback button)
26: capturing mode switching lever
28: print ejection port
30: unlocking lever
42: image sensor
50: film loading room
52: film delivery mechanism
52a: claw
54: film transport mechanism
54A: transport roller pair
54B: spreading roller pair
56: print head
100: instant film pack
110: instant film
110a: exposure surface
110b: observation surface
112: exposure part
114: pod part
114a: development treatment liquid pod
116: trap part
116a: absorbing material
118: observation part
118a: frame of instant film
120: case
120a: opening
120b: ejection port
120c: claw opening
212: imaging lens driving unit
214: image sensor driving unit
216: analog signal processing unit
218: image data input unit
220: digital signal processing unit
222: internal memory
222a: first storage area
222b: second storage area
230: film delivery mechanism driving unit
232: film transport mechanism driving unit
234: print head driving unit
236: image signal processing unit for printing
240: system controller
240a: recording control unit
240b: playback control unit
240c: image processing unit
240d: capturing control unit
240e: print control unit
242: work memory
244: data memory
246: monitor driving unit
248: operation unit
250: power supply unit
252: card slot
254: memory card
256: communication unit
DL: dialog
F: utilization direction of instant film
f: ejection direction of instant film
F1: frame of image
Im: image
Im1: print imaging image
LVI: live view image
SBL: side bar
SBR: side bar
S10 to S18: process procedure in auto mode
S16a to S16c: process procedure in case printed image is recorded in first storage area
S20 to S31: process procedure in manual mode
S40 to S50: process procedure in second playback mode
S60 to S67: process procedure in first playback mode

What is claimed is:

1. A printer comprising:
an image input unit that receives an image;
a first storage unit that stores images;
a second storage unit that stores images; and
a recording control unit that records a printed image in the first storage unit, and records the image received by the image input unit in the second storage unit,
wherein copying of an image from the first storage unit to the second storage unit is permitted, and copying of an image from the second storage unit to the first storage unit is prohibited.

2. The printer according to claim 1,
wherein, in a case where a specified number of images are recorded in the first storage unit or in a case where a remaining capacity of the first storage unit is insufficient, the recording control unit removes an image of which a printing time point is the oldest from the first storage unit, and records a newly printed image in the first storage unit.

3. The printer according to claim 2,
wherein, in a case where an image read out from the first storage unit is printed, the recording control unit updates only information of a printing time point of the printed image.

4. The printer according to claim 2,
wherein, the first storage unit has a storage capacity smaller than that of the second storage unit.

5. The printer according to claim 3,
wherein, the first storage unit has a storage capacity smaller than that of the second storage unit.

6. The printer according to claim 2,
wherein copying of an image from the first storage unit to the second storage unit is permitted, and copying of an image from the second storage unit to the first storage unit is prohibited.

7. The printer according to claim 1,
wherein, the first storage unit has a storage capacity smaller than that of the second storage unit.

8. The printer according to claim 1,
wherein an internal memory functions as the first storage unit and the second storage unit.

9. The printer according to claim 1,
wherein an internal memory functions as the first storage unit, and
a detachable and attachable external memory functions as the second storage unit.

10. The printer according to claim 1,
wherein the image input unit receives an image from an external device through communication.

11. A digital camera with a printer comprising:
the printer according to claim 1; and
a capturing unit that includes a capturing optical system and an image sensor,
wherein the image input unit receives an image captured by the capturing unit.

12. The digital camera with a printer according to claim 11, further comprising:
a capturing mode selection unit that selects a first capturing mode or a second capturing mode,
wherein, in a case where the first capturing mode is selected by the capturing mode selection unit, the image captured by the capturing unit is automatically printed.

13. A printer comprising:
an image input unit that receives an image;
a first storage unit that stores images;
a second storage unit that stores images;
a recording control unit that records a printed image in the first storage unit, and records the image received by the image input unit in the second storage unit;
a display unit;
a playback mode selection unit that selects a first playback mode or a second playback mode;
a playback control unit that plays the image recorded in the first storage unit on the display unit in a case where the first playback mode is selected by the playback mode selection unit, and plays the image recorded in the second storage unit on the display unit in a case where the second playback mode is selected; and
a print instruction unit that transmits an instruction to print an image being played.

14. The printer according to claim 13,
wherein the playback control unit plays the images recorded in the first storage unit in order in which a printing time point is new in a case where the first playback mode is selected.

15. The printer according to claim 13, further comprising:
a processing instruction unit that transmits an instruction to process an image being played; and
an image processing unit that processes an image being played according to the instruction to process the image from the processing instruction unit.

16. The printer according to claim 15,
wherein the image processing unit performs at least one of a vignetting process, an effect process, or brightness changing, as image processing.

17. A digital camera with a printer comprising:
the printer according to claim 13; and
a capturing unit that includes a capturing optical system and an image sensor,
wherein the image input unit receives an image captured by the capturing unit.

18. A printing method of a printer that includes an image input unit which receives an image, a first storage unit which stores images, and a second storage unit which stores images, the method comprising:
a step of printing an image received from the image input unit, an image read out from the first storage unit, or an image read out from the second storage unit;
a step of recording the printed image in the first storage unit; and
a step of recording the image received from the image input unit in the second storage unit,
wherein a step of copying of an image from the first storage unit to the second storage unit is permitted, and a step of copying of an image from the second storage unit to the first storage unit is prohibited.

19. The printing method according to claim 18,
wherein, in the step of recording the printed image in the first storage unit, an image of which a printing time point is the oldest is removed from the first storage unit, and a newly printed image is recorded in the first storage unit in a case where a specified number of images are recorded in the first storage unit or a remaining capacity of the first storage unit is insufficient.

20. The printing method according to claim 19,
wherein, in the step of recording the printed image in the first storage unit, only information of a printing time point of the printed image is updated in a case where the image read out from the first storage unit is printed.

* * * * *